US011843297B2

(12) United States Patent
Gomi et al.

(10) Patent No.: US 11,843,297 B2
(45) Date of Patent: Dec. 12, 2023

(54) ROTATING VIBRATION ACTUATOR WITH A WEIGHT AND ELECTRONIC APPARATUS

(71) Applicants: Yoshihiro Gomi, Tokyo (JP); Takanori Kato, Tokyo (JP); Yuki Takahashi, Tokyo (JP)

(72) Inventors: Yoshihiro Gomi, Tokyo (JP); Takanori Kato, Tokyo (JP); Yuki Takahashi, Tokyo (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 17/449,294

(22) Filed: Sep. 29, 2021

(65) Prior Publication Data

US 2022/0103052 A1  Mar. 31, 2022

(30) Foreign Application Priority Data

Sep. 30, 2020 (JP) ................................ 2020-164639
Sep. 30, 2020 (JP) ................................ 2020-164641

(51) Int. Cl.
*H02K 33/16* (2006.01)
*H02K 33/18* (2006.01)

(52) U.S. Cl.
CPC ............ *H02K 33/16* (2013.01); *H02K 33/18* (2013.01)

(58) Field of Classification Search
CPC ........ H02K 33/18; H02K 33/16; H02K 33/02; H02K 35/04; H02K 35/00; B06B 1/045
See application file for complete search history.

(56) References Cited

U.S. PATENT DOCUMENTS

2006/0255665 A1    11/2006  Kraus
2008/0150380 A1*   6/2008   Hsiao ..................... H02K 1/145
                                                            310/257
(Continued)

FOREIGN PATENT DOCUMENTS

JP    2002-177882 A     6/2002
JP      4875133 B2    12/2011
(Continued)

OTHER PUBLICATIONS

Lee (KR 20150128264 A) English Translation (Year: 2015).*
(Continued)

*Primary Examiner* — Tulsidas C Patel
*Assistant Examiner* — Robert E Mates
(74) *Attorney, Agent, or Firm* — Shih IP Law Group, PLLC.

(57) ABSTRACT

Provided is a vibration actuator including: a movable body including a coil and a core around which the coil is wound; a fixing body including a magnet; and a shaft part turnably supporting the movable body with respect to the fixing body on a side of the one end part of the core. The movable body reciprocatingly and rotationally vibrates around the shaft part with respect to the fixing body by cooperation between the coil to be energized and the magnet. The magnet is disposed to face the other end part of the core in an extending direction of the core when energization is not performed. The magnet includes two magnetic poles having different polarities and arranged in a reciprocating and rotational vibration direction. A weight part is disposed in a notch on a side of the other end part of the core or in the coil.

5 Claims, 21 Drawing Sheets

(56) References Cited

U.S. PATENT DOCUMENTS

| | | | |
|---|---|---|---|
| 2011/0101796 A1 | 5/2011 | Odajima | |
| 2015/0137627 A1 | 5/2015 | Katada | |
| 2018/0367019 A1* | 12/2018 | Takahashi | ........... H04M 19/047 |
| 2019/0386552 A1 | 12/2019 | Takahashi | |
| 2020/0076287 A1 | 3/2020 | Takahashi | |
| 2021/0273543 A1* | 9/2021 | Takahashi | ............... B06B 1/045 |

FOREIGN PATENT DOCUMENTS

| | | | | |
|---|---|---|---|---|
| JP | 2015-095943 A | | 5/2015 | |
| JP | 2015-112013 A | | 6/2015 | |
| KR | 20090115330 A | * | 11/2009 | |
| KR | 20150128264 A | * | 11/2015 | |
| WO | 2017051843 A1 | | 3/2017 | |
| WO | WO-2020013161 A1 | * | 1/2020 | ............. B06B 1/045 |

OTHER PUBLICATIONS

Whan (KR 20090115330 A) English Translation (Year: 2009).*
Office Action dated Oct. 18, 2023 for the related U.S. Appl. No. 17/259,206.

* cited by examiner

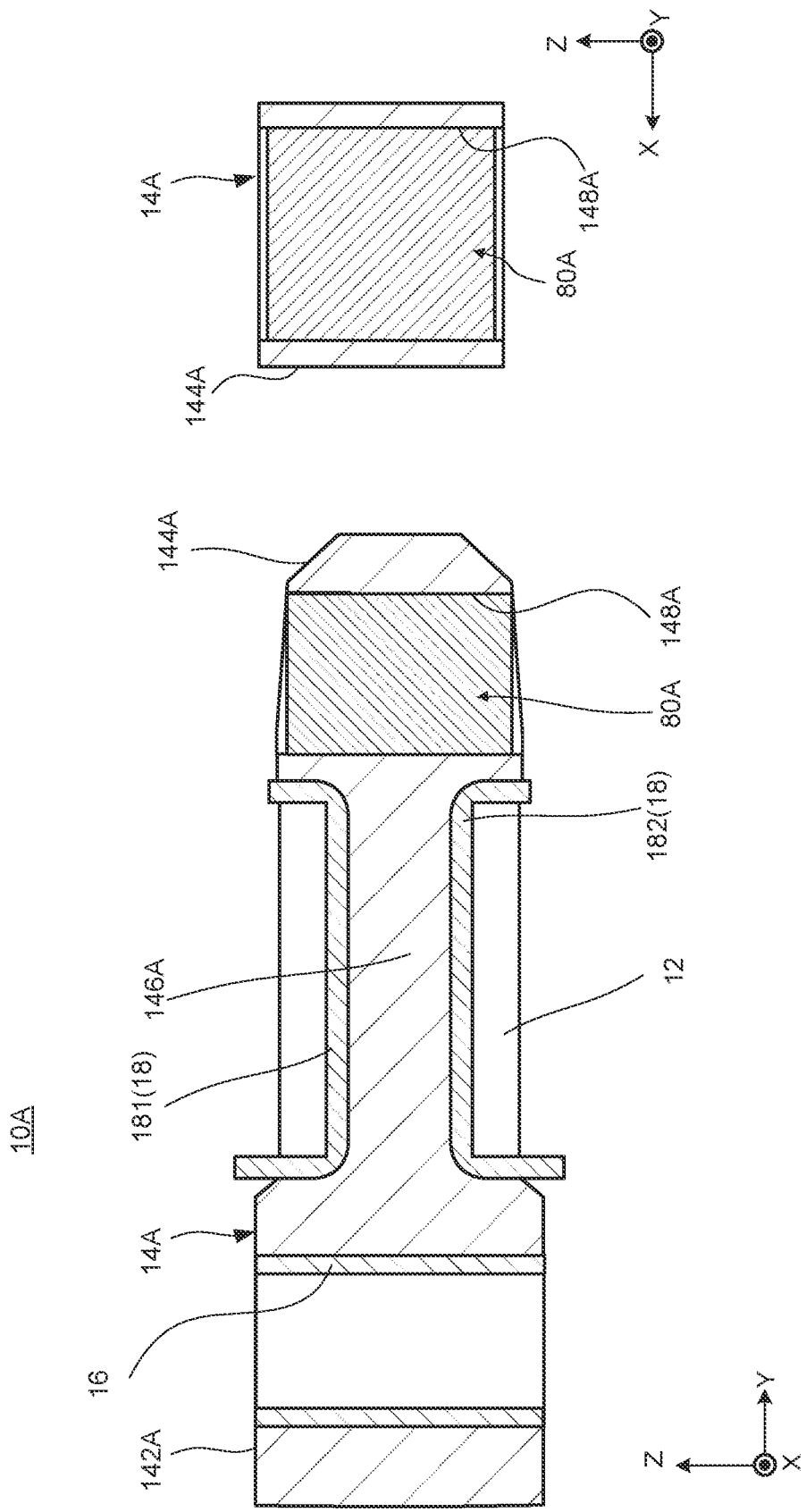

ROTATING VIBRATION ACTUATOR WITH A WEIGHT AND ELECTRONIC APPARATUS

CROSS REFERENCE TO RELATED APPLICATIONS

This application is entitled to (or claims) the benefit of Japanese Patent Application No. 2020-164639, filed on Sep. 30, 2020, and Japanese Patent Application No. 2020-164641, filed on Sep. 30, 2020, the disclosure of which including the specification, drawings and abstract is incorporated herein by reference in its entirety.

TECHNICAL FIELD

The present invention relates to a vibration actuator and an electronic apparatus.

BACKGROUND ART

In the related art, a vibration actuator is mounted in an electronic apparatus, as a vibration generation source for notifying an incoming call or for improving a feeling of operation on a touch screen or realism of an amusement device such as a controller of a game machine by transmitting vibration to a finger, a thumb, a limb, or the like. Note that, examples of the electronic apparatus include a portable communication terminal such as a mobile phone or a smartphone, a portable information terminal such as a tablet PC, a portable game terminal, a controller (gamepad) of a stationary game machine, and a wearable terminal attached to clothes, an arm, or the like.

Patent Literatures (hereinafter, "Patent Literature" will be referred to as "PTL") 1 to 3 disclose vibration actuators which include: a fixing body including a coil; and a movable body including a magnet, and which generate vibration by reciprocating the movable body by utilizing a driving force of a voice coil motor formed of the coil and the magnet. These vibration actuators are linear actuators in which the movable body linearly moves along a shaft, are mounted such that the vibration direction is parallel to a main surface of an electronic apparatus, and transmit vibration in a direction along a body surface of a user which comes into contact with the electronic apparatus, to the body surface.

Further, as a vibration actuator, there is known a vibration actuator that supports a movable body in a cantilever manner such that the movable body is capable of swaying (see PTL 4).

In this vibration actuator, the movable body is formed by disposing a magnet having a cylindrical shape in a yoke having a cup shape on a side of a leading end of a plate spring which is fixed to a fixing body on a side of a base end of the plate spring. The leading end of the plate spring serves as a movable end. Further, a coil is disposed on a side of the fixing body of the vibration actuator such that an upper end of the coil is located between the magnet and an edge of the yoke. The moving body vibrates by energizing the coil.

CITATION LIST

Patent Literature

PTL 1
Japanese Patent Application Laid-Open No. 2015-095943
PTL 2
Japanese Patent Application Laid-Open No. 2015-112013
PTL 3
Japanese Patent No. 4875133
PTL 4
Japanese Patent Application Laid-Open No. 2002-177882

SUMMARY OF INVENTION

Technical Problem

Incidentally, a vibration actuator of a cantilever type that supports a movable body in a cantilever manner such that the movable body is capable of swaying can have a simple configuration in comparison with a configuration in which a movable body is supported by a shaft or at a plurality of positions.

In this configuration, it is necessary to increase thrust, that is, to increase the G value indicating vibration in order to enhance a feeling of vibration. To this end, it is conceivable to take measures to enlarge the thickness dimension of a magnet, that is, the size of the magnet itself to increase magnetic fluxes in a magnetic circuit.

However, since a yoke is easily magnetically saturated only by using simply a thick magnet having a large size, it is also necessary to enlarge the thickness of the yoke in accordance with the thickness of the magnet. In a case where the size of the magnet is set in advance, problems occur in which the dimension of the vibration actuator on a side of a movable body in accordance with the size of the magnet will also be greatly affected, inertia decreases, and the resonance point becomes high. Accordingly, there has been a demand to realize driving while increasing inertia and maintaining the resonance point in a state in which sufficient magnetic characteristics are ensured.

An object of the present invention is to provide a vibration actuator and an electronic apparatus which are capable of increasing inertia and generate a suitable vibration without an increase in size.

Solution to Problem

In order to achieve the object described above, the present invention provides a vibration actuator including:
  a movable body including a coil and a core around which the coil is wound, where the core extends in a direction of a winding axis of the coil and includes a first end part and a second end part that protrude from both ends of the coil, respectively;
  a fixing body including a magnet; and
  a shaft part turnably supporting the movable body with respect to the fixing body on a side of the first end part of the core. The movable body reciprocatingly and rotationally vibrates around the shaft part with respect to the fixing body by cooperation between the coil and the magnet, where the coil is energized. The vibration actuator has a configuration in which:
  the magnet is disposed to face at least the second end part of the core of the first end part and the second end part of the core in an extending direction of the core when energization is not performed, and the magnet includes two magnetic poles which have different polarities and which are arranged in a reciprocating and rotational vibration direction,
  the core includes a notch on a side of the second end part, and
  a weight part is fixed to the notch.

A vibration actuator according to an aspect of the present invention includes:

a movable body including a coil and a core around which the coil is wound, where the core includes a first end part and a second end part that protrude from both ends of the coil, respectively;

a fixing body including a magnet; and a shaft part turnably supporting the movable body with respect to the fixing body on a side of the first end part of the core, where the movable body reciprocatingly and rotationally vibrates by cooperation between the coil and the magnet, where the coil is energized. The vibration actuator has a configuration in which:

the magnet is disposed away from and facing at least the second end part when energization is not performed, and the magnet includes two magnetic poles which have different polarities and which are arranged in a reciprocating and rotational vibration direction, and a weight part is disposed in the coil.

An electronic apparatus according to an aspect of the present invention has a configuration in which the aforementioned vibration actuator is mounted therein.

Advantageous Effects of Invention

The present invention makes it possible to increase inertia and generates a suitable vibration without an increase in size.

BRIEF DESCRIPTION OF DRAWINGS

FIGS. 9A and 9B are cross-sectional views illustrating a configuration of principal parts of Variation 1 of vibration actuator 1;

DESCRIPTION OF EMBODIMENTS

Hereinafter, embodiments of the present invention will be described in detail with reference to the accompanying drawings.

Embodiment 1

Hereinafter, an embodiment of the present invention will be described in detail with reference to the accompanying drawings.

[Overall Configuration of Vibration Actuator 1]

Figure 1:
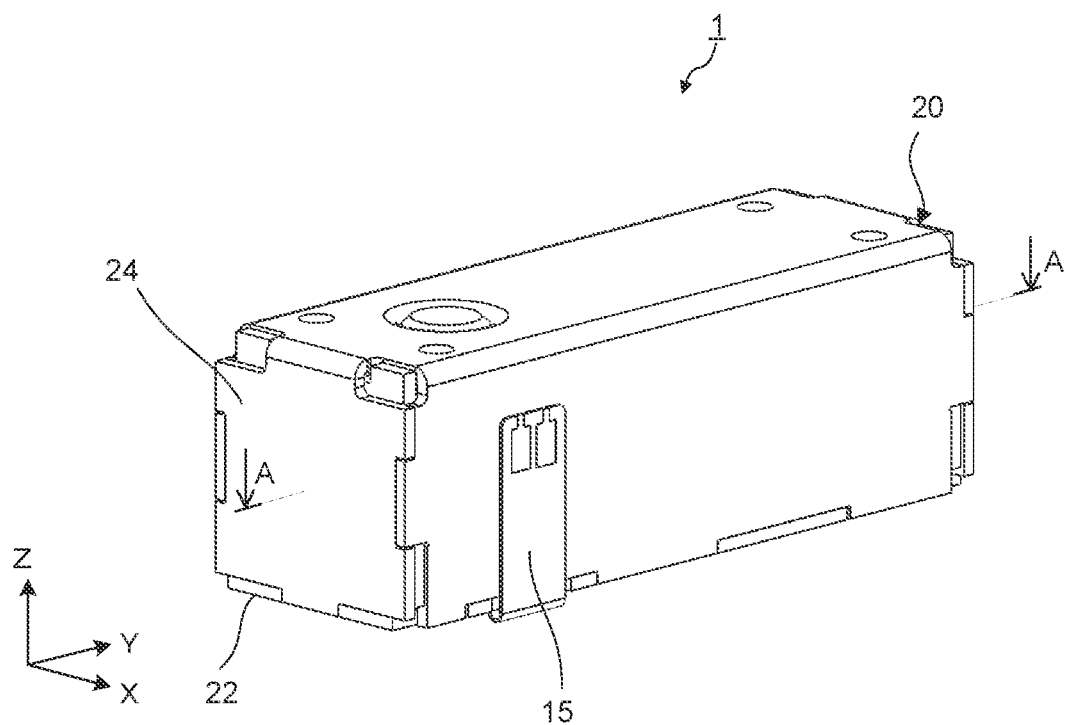
FIG. 1 is a perspective view of an external appearance of a vibration actuator according to Embodiment 1 of the present invention.
Figure 2:
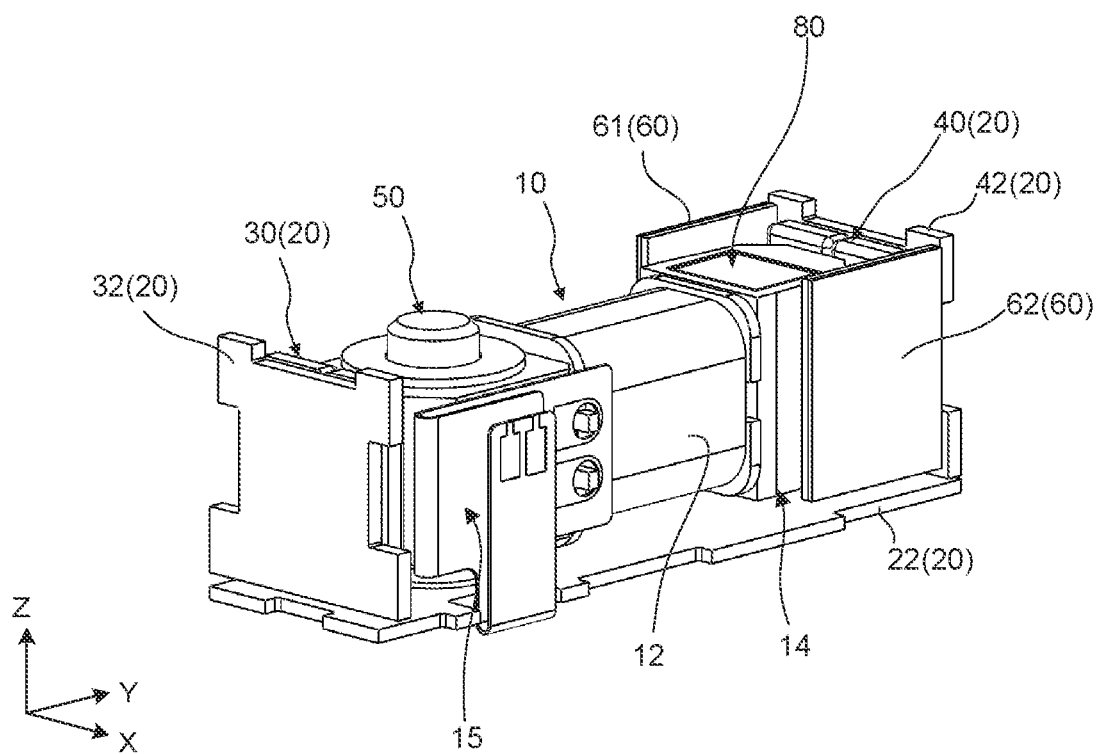
FIG. 2 is a perspective view of the vibration actuator in a state in which a case of the vibration actuator is detached.
Figure 3:
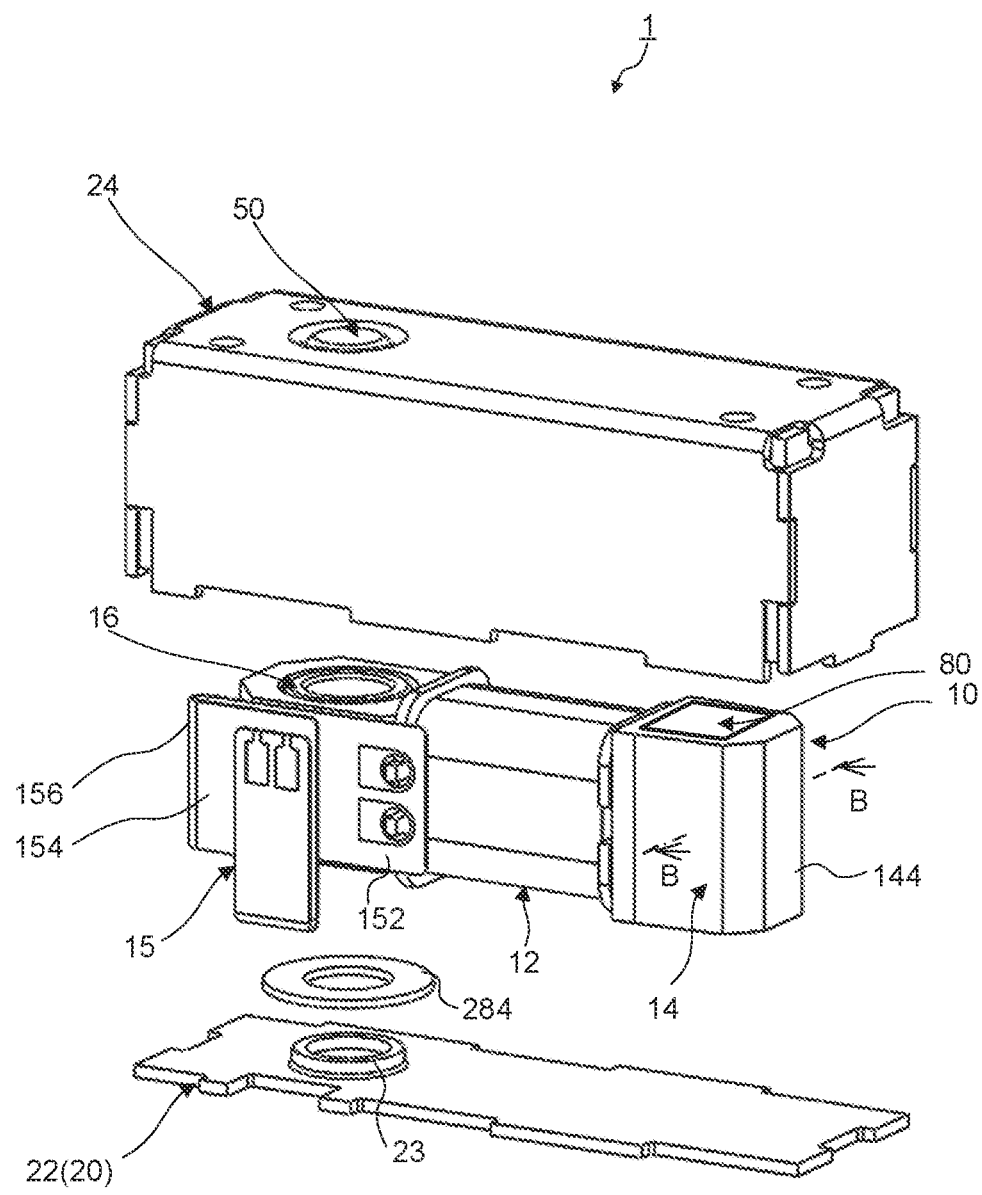
FIG. 3 is an exploded perspective view of the vibration actuator in which a fixing body and a movable body are illustrated.
Figure 4:
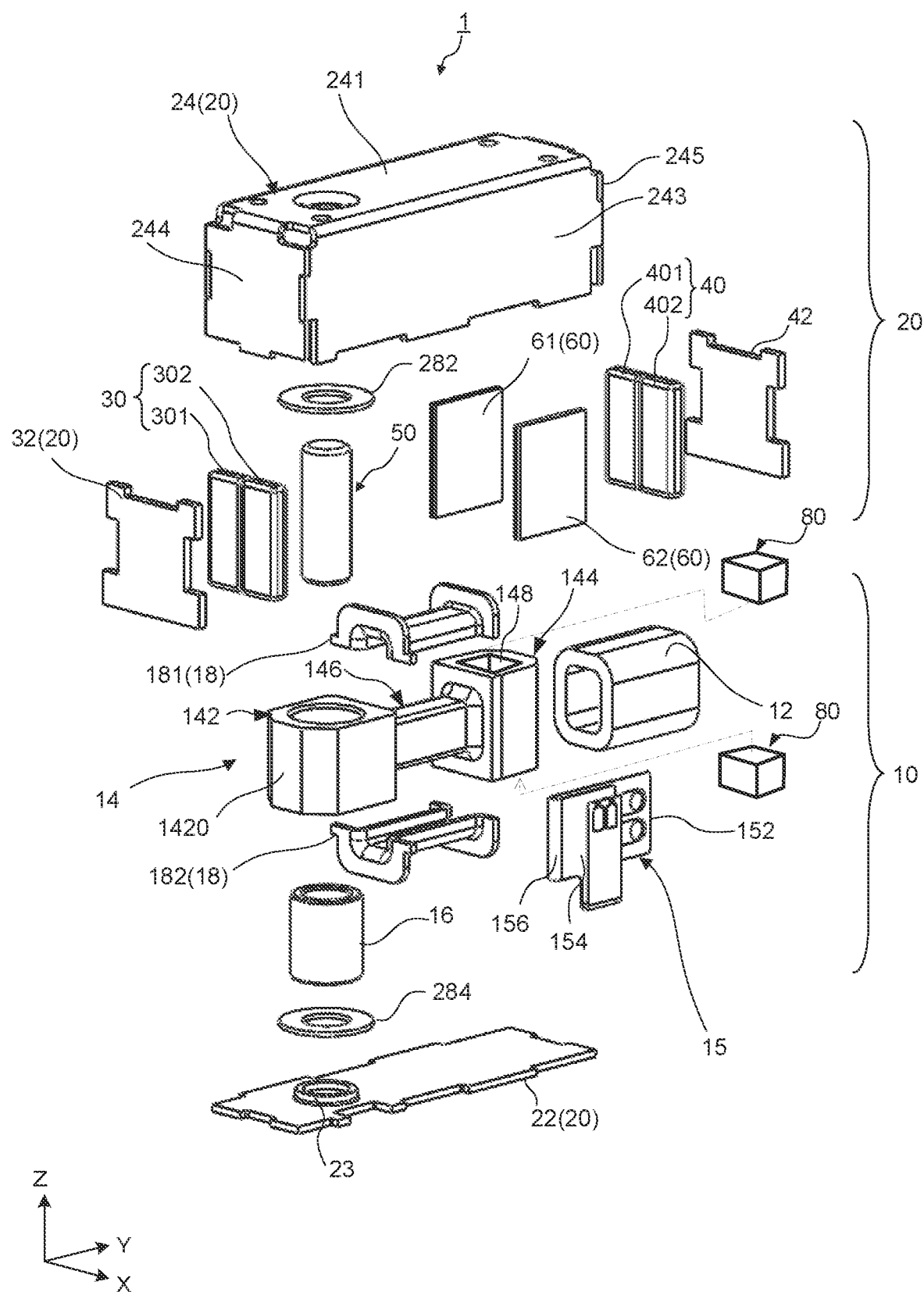
FIG. 4 is an overall exploded perspective view of the vibration actuator.

FIG. 1 is a perspective view of an external appearance of a vibration actuator according to the embodiment of the present invention. FIG. 2 is a perspective view of the vibration actuator in a state in which a case of the vibration actuator is detached. Further, FIG. 3 is an exploded perspective view of the vibration actuator in which a fixing body and a movable body are illustrated, and FIG. 4 is an overall exploded perspective view of the vibration actuator.

In the present embodiment, an orthogonal coordinate system (X, Y, Z) will be used for explanation. The drawings described later (including the drawings used for describing Variations 1 and 2 as well) are also illustrated with the common orthogonal coordinate system (X, Y, Z). Hereinafter, the width, depth, and height of vibration actuator 1 are lengths in X, Y, and Z directions, respectively. For convenience, in FIGS. 1 to 4, the vibration actuator of the present embodiment is illustrated by disposing the X direction toward a lateral direction, which will be described as a vibration direction. Further, an "axis of the movable body" in the present embodiment means the Y direction around the movable body, and is the same axis as a coil center axis in the present embodiment. Note that, the X direction and the minus X direction may be set as both sides, the plus side in the Z direction may be set as an upper side, and the minus side in the Z direction may be set as a lower side.

As illustrated in FIGS. 1 to 4, vibration actuator 1 includes movable body 10, shaft part 50, and fixing body 20. Movable body 10 is supported by fixing body 20 via shaft part 50.

In order that a side of another end of movable body 10 reciprocates while shaft part 50 inserted through movable body 10 on a side of one end thereof serves as a fulcrum, movable body 10 is turnably supported by fixing body 20. Vibration actuator 1 includes weight part 80 as a part of a portion forming a main body of movable body 10. Weight part 80 is provided in a notched part of a portion forming a main body of core 14 such that weight part 80 does not come off.

For example, vibration actuator 1 is mounted in an electronic apparatus such that a vibration transmitting surface of the electronic apparatus, which comes into contact with a user, is parallel to the XY plane. In an electronic apparatus, for example, the vibration transmitting surface is a surface with which a body surface, such as a finger, a thumb or the like, of a user comes into contact (a surface on which an operation button or the like is disposed, or a rear surface on which another finger or the like abuts) in the case of a game controller, and the vibration transmitting surface is a touch screen surface in the case of a smartphone or a tablet terminal. Further, in a wearable terminal attached to a user's clothes, arm or the like, the vibration transmitting surface is an outer surface that comes into contact with the clothes or arm (inner peripheral surface 208 indicated in FIG. 24).

In vibration actuator 1, movable body 10 includes coil 12, and core 14 around which coil 12 is wound. Fixing body 20 includes magnets (first magnet 30 and second magnet 40).

Movable body 10 is movably supported with respect to fixing body 20 by a magnetic spring by means of a magnetic attraction force of the magnets (first magnet 30 and second magnet 40). In the present embodiment, movable body 10 is movably supported around shaft part 50 with respect to fixing body 20 by a magnetic spring formed of the magnets (first magnet 30 and second magnet 40), coil 12, and core 14.

[Shaft Part 50]

Figure 5:
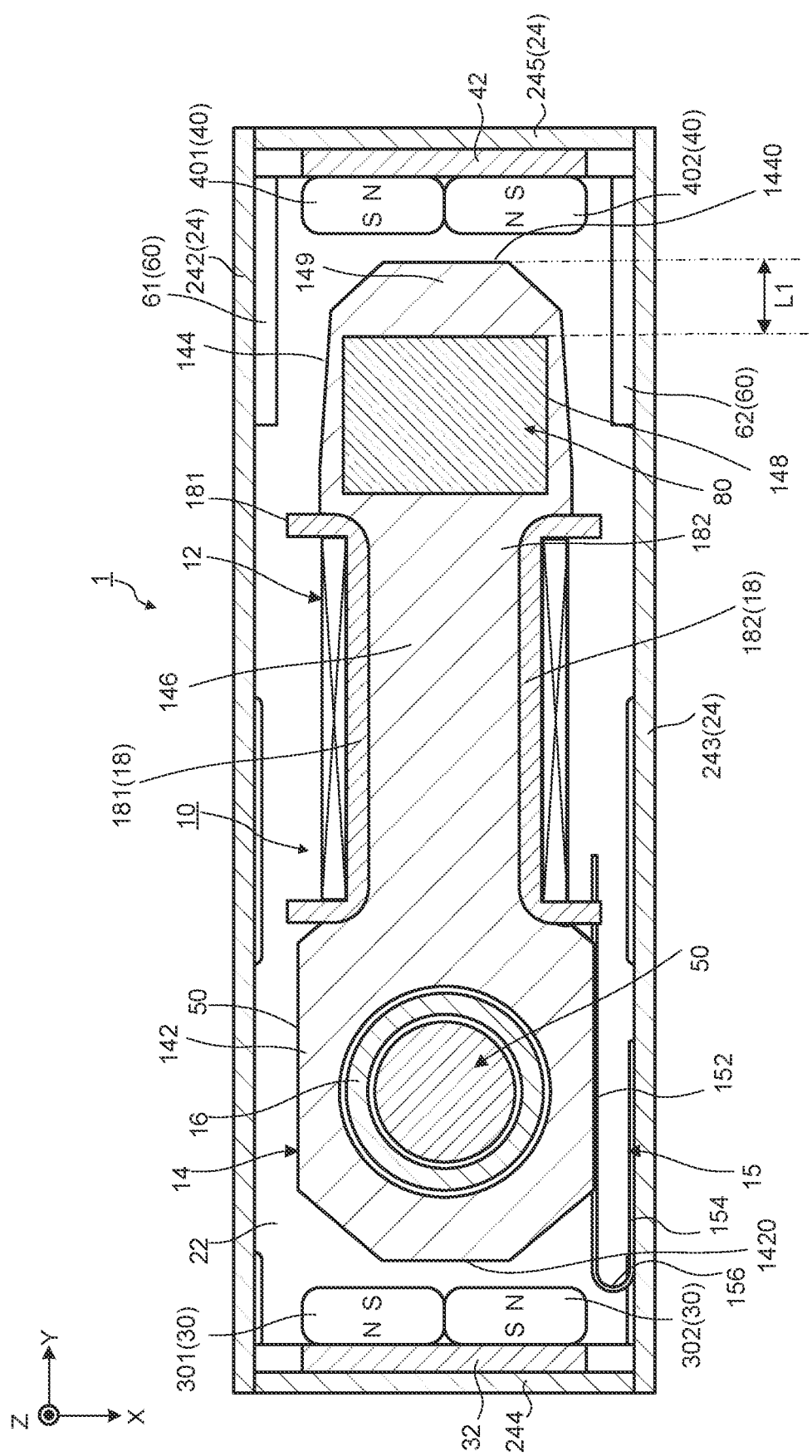
FIG. 5 is a cross-sectional view taken along line A-A in FIG. 1.

FIG. 5 is a cross-sectional view taken along line A-A in FIG. 1.

Shaft part 50 illustrated in FIGS. 2 to 5 supports movable body 10 such that movable body 10 is capable of reciprocatingly and rotationally moving, that is, vibrating around the shaft with respect to the fixing body 20.

Shaft part 50 may be formed of either a non-magnetic body or a magnetic body. In the present embodiment, shaft part 50 is formed of a magnetic body such as SUS420J2, for example.

Shaft part 50 is disposed between base plate 22 and upper surface part 241 of case 24 that also functions as a cover. Base plate 22 and case 24 are disposed to face each other so as to hold movable body 10 therebetween. Washer 282 that is externally applied to shaft part 50 is interposed between upper surface part 241 of case 24 and movable body 10, and washer 284 that is externally applied to shaft part 50 is interposed between base plate 22 and movable body 10. By washers 282 and 284 described above, shaft part 50 supports movable body 10 such that movable body 10 smoothly reciprocates and rotates with respect to fixing body 20.

[Movable Body 10]

Movable body 10 includes weight part 80 on a side of a leading end and, for example, fixes weight part 80 to a part of a movable body-main body and increases inertia without affecting the magnetic spring constant and torque without magnetic flux saturation. Hereinafter, movable body 10 will be specifically described.

In movable body 10, coil 12 is wound around core 14 via coil bobbin 18. Core 14 extends from a side of one end of movable body 10 to a side of another end thereof, and forms the movable body-main body.

Movable body 10 includes bushing (bearing) 16, which is a bearing provided on a side of one end of core 14, and weight part 80 provided on a side of another end (a side of a leading end) of core 14.

Core 14 is a magnetic body which is formed to extend in a direction of a coil axis of coil 12 and which is magnetized by energizing coil 12. Core 14 is disposed between base plate 22 and upper surface part 241 of case 24 with predetermined intervals from each of base plate 22 and upper surface part 241. Here, the predetermined intervals refer to a space forming a movement range of movable body 10. Core 14 is provided to extend in a direction of a winding axis of coil 12 wound around core 14. In core 14, one end part 142 and another end part 144 protrude from both sides of coil 12.

Core 14 may be a ferrite core. Further, core 14 may be formed of an electromagnetic stainless steel, a sintered material, an MIM (metal injection molding) material, a laminated steel plate, an electrogalvanized steel plate (SECC, with a specific gravity of 7.85), or the like.

Core 14 is provided to extend in a direction orthogonal to an axial direction of shaft part 50. Bushing 16 is fitted into a through-hole formed on the side of the one end of core 14, and core 14 turns via shaft part 50 inserted through bushing 16. Core 14 vibrates, with the other end part thereof as a free end part, in a direction, here in the X direction, orthogonal to a direction in which base plate 22 and upper surface part 241 of case 24 extend. Base plate 22 and case 24 are fixing body 20.

In core 14, shaft part 50, coil 12, and another end part 144 which forms the free end part are arranged in this order from one end part 142 toward the side of the other end (the side of the leading end) of core 14.

Bushing 16 provided on a side of one end part 142 of core 14 has a tubular shape, and causes movable body 10 to be turnable around shaft part 50 that is inserted through bushing 16. Bushing 16 may be formed by any material such as a metal, such as a sintered metal, and a resin. In a case where shaft part 50 is a magnetic body, bushing 16 is preferably formed of a non-magnetic material. Further, when shaft part 50 is a non-magnetic body, bushing 16 may be formed of a magnetic body. Thus, when one of shaft part 50 and bushing 16 is a non-magnetic body, a magnetic flux passing through core 14 does not pass between shaft part 50 and bushing 16, and no increase in friction due to generation of a magnetic attraction force occurs between both.

That is, no friction due to a magnetic attraction force is generated between bushing 16 and shaft part 50 inserted through bushing 16, and movable body 10 can be turned smoothly. For example, vibration actuator 1 may be formed by using a magnetic shaft having durability (for example, SUS420J2) as shaft part 50 and a copper-based sintered bearing as bushing 16, which makes it possible to suppress a magnetic attraction force unnecessary for driving of movable body 10 and to hold movable body 10 with low friction. That is, it is possible to suppress wear due to driving of movable body 10 and to realize vibration actuator 1 with a high reliability.

Further, one end part 152 of flexible substrate 15 is fixed to one end part 142 of core 14. Both end parts of coil 12 are connected to a circuit of flexible substrate 15.

Flexible substrate 15 supplies power to coil 12. In the present embodiment, flexible substrate 15 is disposed so as to connect movable body 10 and fixing body 20.

Flexible substrate 15 includes one end part 152, another end part 154, and at least one curved part 156 between one end part 152 and another end part 154. One end part 152 is connected to coil 12 of movable body 10. Another end part 154 is fixed on a side of fixing body 20. Curved part 156 has flexibility and is electrically connected to coil 12 from a side of one end of flexible substrate 15. Curved part 156 is interposed between one end part 152 and another end part 154, and has flexibility to be deformed following the vibration of movable body 10. Curved part 156 bends in the direction orthogonal to the axial direction of shaft part 50.

Coil 12 is a coil that is energized to move movable body 10, and is energized to magnetize core 14. Especially, one end part 142 and another end part 144 are energized to become magnetic poles. Coil 12 changes the polarities of the both end parts (one end part 142 and another end part 144) of core 14 by switching the energization direction.

Core part 146 that communicates one end part 142 and another end part 144 of core 14 is provided between one end part 142 and another end part 144 of core 14. Core part 146 is a portion having an outer shape smaller than the outer shapes of one end part 142 and another end part 144. Coil bobbin 18 (divided bobbin bodies 181 and 182) around which coil 12 is wound is externally applied to core part 146.

Coil bobbin 18 is formed of divided bobbin bodies 181 and 182. Each of divided bobbin bodies 181 and 182 is externally applied and fixed to core part 146 so as to circumferentially surround core part 146. For example, divided bobbin bodies 181 and 182 may be formed of a resin material such as a polyamide resin, a liquid crystal polymer, and a polyphenylene sulfide resin (PPS resin).

By winding coil 12 around core 14 via coil bobbin 18, movable body 10 has a rectangular parallelepiped shape with a smaller facing width from a side of one end part 142 toward a side of another end part 144. The winding axis of coil 12 is a coil axis, and is also the central axis of core part 146. The direction of the winding axis of coil 12 is the direction of the coil axis, and an extending direction of core 14.

By energizing and exciting coil 12, a center of a length of each of end surfaces 1420 and 1440 (see FIG. 5) of core 14 in the vibration direction (the X direction) becomes a center of magnetic poles in the base end part and the leading end part of core 14, that is, in one end part 142 and another end part 144 thereof. End surfaces 1420 and 1440 are located in an axial direction of coil 12.

In movable body 10, the center of the magnetic poles of movable body 10 is located at the center of core part 146 on the coil axis of coil 12.

Another end part 144 has such a shape that in core 14, a side of a leading end of core part 146 protrudes toward the radial direction around the axis of core part 146. Another end part 144 is provided with weight part 80.

Figure 6:
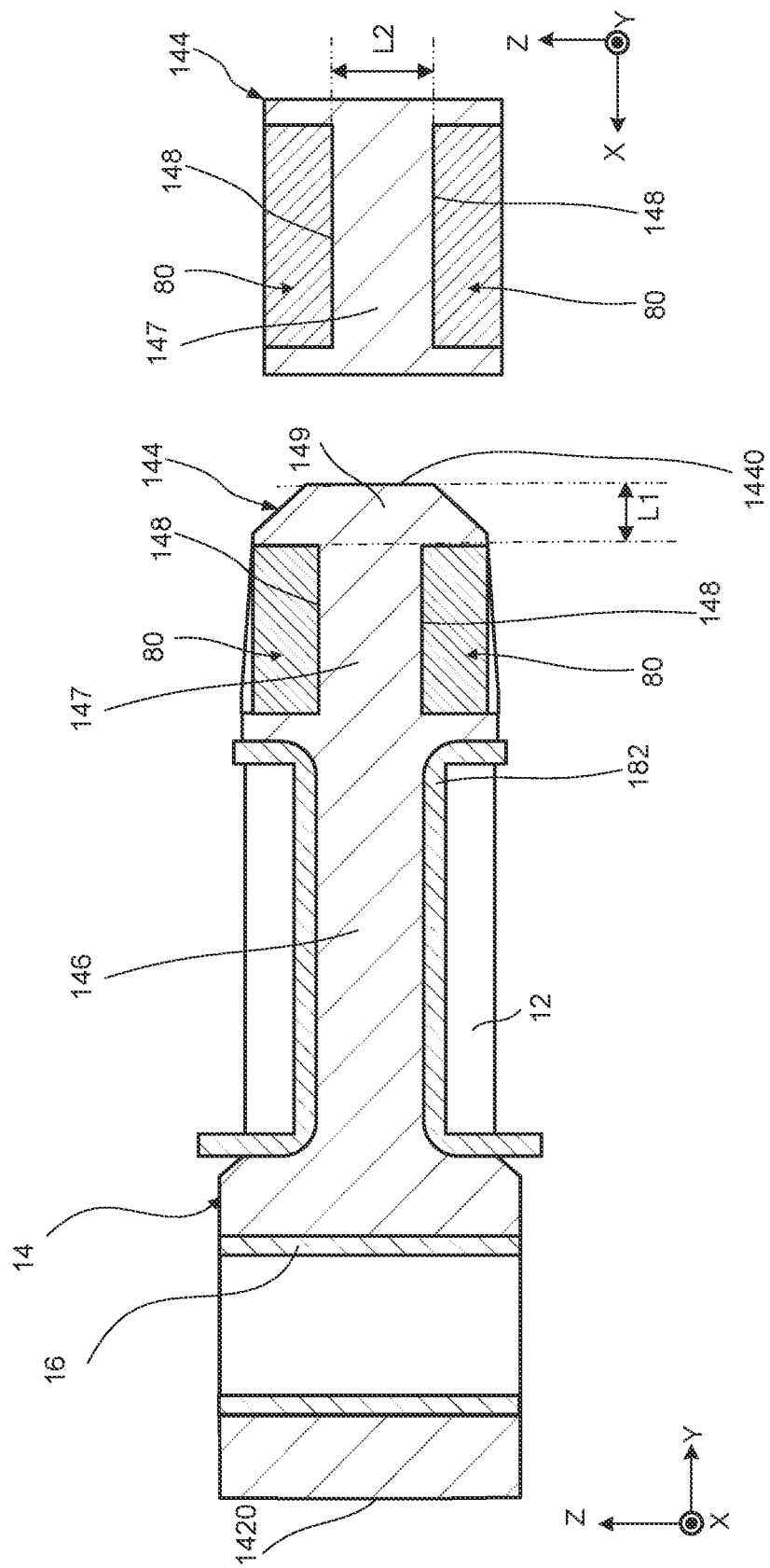
FIGS. 6A and 6B are cross-sectional views provided for describing the movable body.

FIGS. 6A and 6B are diagrams provided for describing the movable body. FIG. 6A is a longitudinal cross-sectional view of the movable body for describing the movable body. FIG. 6B is a cross-sectional view taken along line B-B in FIG. 3.

As illustrated in FIGS. 4 to 6B, another end part 144 includes notch 148 having a shape obtained by notching a part of core 14. Weight part 80 is attached to notch 148. Notch 148 may be a groove part or a hole.

Notches 148 are formed in a recessed shape at two positions in a direction parallel to an extending direction of shaft part 50 so as to open, respectively. Weight part 80 is attached within each recessed shape so as to fill the inside of the recessed shape. With notches 148, core 14, here, another end part 144 includes extended core part 147 which is a central part of another end part 144, includes the axis of core 14, and is continuous with core part 146.

Notch 148 is provided in another end part 144 such that head part 149 which forms the free end has thickness L1 in the extending direction of core 14 in which no magnetic saturation occurs. Further, in another end part 144, extended core part 147, which is a portion held between weight parts 80 and which is on an extension of core part 146, has thickness L2 that is a thickness at a fixed ratio to the overall thickness of another end part 144. Notch 148 is provided in another end part 144 of core 14 such that extended core part 147 extending in the extending direction of core 14 has a cross section with an area at a fixed ratio. This configuration prevents a decrease in magnetic characteristics and a reduction in magnetic fluxes.

In core 14, weight part 80 is fixed within notch 148 having a recessed shape so as not to be detached from core 14 even when a centrifugal force is generated by the turn of movable body 10, that is, core 14. For example, another end part 144 of core 14 may hold weight part 80 within notch 148, weight part 80 may be fixed by press-fitting of weight part 80 with respect to notch 148, or weight part 80 may be fixed by adhesion, welding or the like.

Notch 148 is formed correspondingly to the shape of weight part 80, which causes weight part 80 to be more hardly detached from another end part 144. In the present embodiment, notch 148 is formed in a box shape, and weight part 80 is formed in a rectangular parallelepiped shape correspondingly.

Weight part 80 is configured to adjust the weight of movable body 10, and is made of a high specific gravity material. For example, weight unit 80 is preferably formed of a material having a specific gravity twice or higher than (for example, a specific gravity of approximately 16 to 19) that of a material such as an electrogalvanized steel plate (SECC, with a specific gravity of 7.85) used in core 14. For example, tungsten can be applied. Thus, even in a case where the external dimensions of movable body 10 are set in design or the like, it is possible to increase the mass of movable body 10 relatively easily, and it is possible to realize a desired vibration output without affecting the magnetic spring constant and torque without magnetic flux saturation.

[Fixing Body 20]

Fixing body 20 turnably supports movable body 10 via shaft part 50.

Fixing body 20 includes, in addition to the magnets (first magnet 30 and second magnet 40), base plate 22 and case 24. Fixing body 20 further includes buffer part (cushion material) 60.

Base plate 22 is formed by a plate-like material such as a steel plate (a rectangular plate in the present embodiment). In the present embodiment, base plate 22 forms one side surface (here, a bottom surface) of vibration actuator 1.

Case 24 is attached to base plate 22 so as to cover base plate 22, and base plate 22 and case 24 form a housing that movably houses movable body 10. In the present embodiment, the housing is formed to be hollow and to have a rectangular parallelepiped shape. On a side of one end of the housing in the longitudinal direction, shaft part 50 is fixed along a direction orthogonal to the vibration direction of movable body 10. Upper surface part 241 of case 24 forms another side surface facing the one side surface of vibration actuator 1.

On base plate 22, shaft part 50 is erected via shaft fixing part 23 on a side of one end of base plate 22. Above base plate 22, movable body 10 is disposed away from and facing base plate 22. Further, in one end part of base plate 22, first magnet 30 is disposed facing one end surface of one end part 142 of movable body 10, and in another end part of base plate 22, second magnet 40 is disposed facing an end surface (leading end surface) of another end part 144 of movable body 10. Note that, the present embodiment is configured to include first magnet 30, but may omit first magnet 30 and may be configured to include only second magnet 40.

Case 24 is fixed to base plate 22 so as to cover movable body 10 facing base plate 22.

Another end of shaft part 50 is fixed to upper surface part 241 of case 24, which faces base plate 22 in height (the Z direction), via a shaft fixing part (not illustrated).

Case 24 is formed in a box shape (a rectangular box shape in the present embodiment) that opens on a side of base plate 22. Shaft part 50 is disposed between upper surface part 241 of case 24 and base plate 22. Case 24 includes both of side surface parts 242 and 243, one end surface part 244, and another end surface part 245. Both of side surface parts 242 and 243 are disposed away from and facing each other in the vibration direction of movable body 10, for example, in the width direction thereof (the X direction). One end surface part 244 and another end surface part 245 are away from each other in an extending direction of movable body 10 (here, in the depth direction thereof (the Y direction)).

The dimensions of the housing formed by attaching case 24 to base plate 22 are not particularly limited. In the present embodiment, however, the housing is configured so as to have a rectangular parallelepiped shape in which, among the width (the X direction), the depth (the Y direction), and the height (the Z direction), the depth is the longest.

Case 24 and base plate 22 may be formed of a material having conductivity, for example, a plate-like material such as a steel plate (a rectangular plate in the present embodiment). Thus, base plate 22 and case 24 are capable of functioning as electromagnetic shields.

Further, on a side of another end of case 24, buffer part 60 (cushion materials 61 and 62) with which a side of a free end of movable body 10 that vibrates comes into contact is provided in both of side surface parts 242 and 243 of case 24, respectively.

Figure 8A:
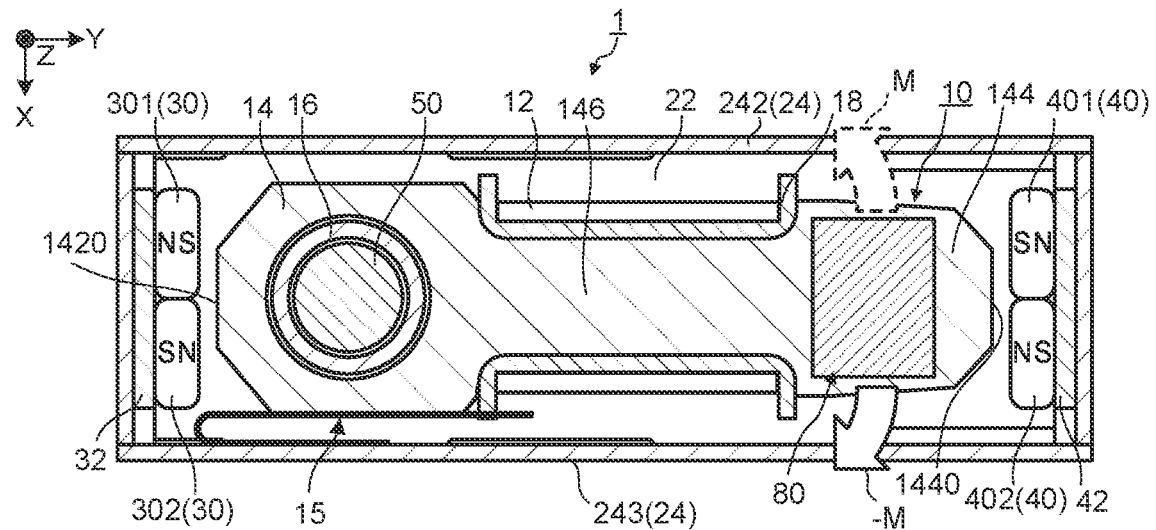
FIGS. 8A, 8B and 8C are cross-sectional views illustrating operation of the movable body.
Figure 8B:
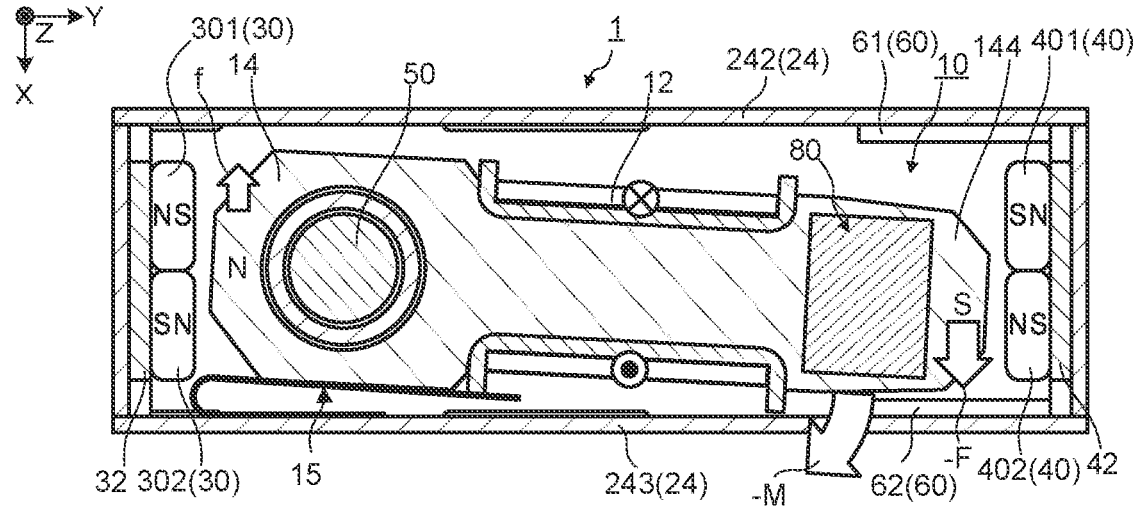
Figure 8C:
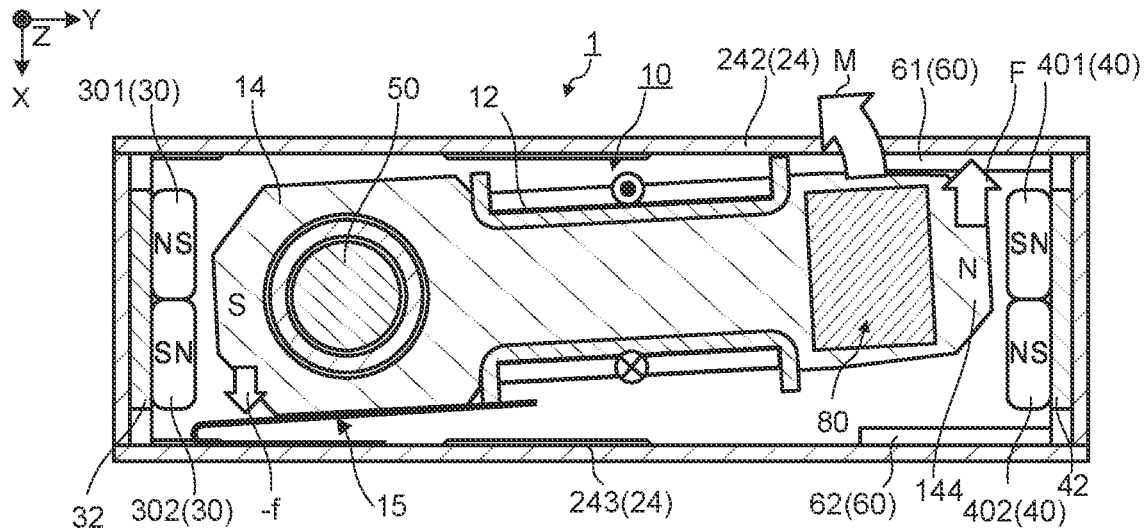

When movable body 10 vibrates, another end part 144 of movable body 10 comes into contact with buffer part 60, and thereby buffer part 60 transmits the vibration of movable body 10 to the housing of vibration actuator 1 (see FIGS. 8A to 8C). Thus, buffer part 60 makes it possible to generate a large vibration in the housing.

Buffer part 60 is formed by, for example, a soft material such as a rubber, such as an elastomer and a silicone rubber, a resin, or a porous elastic body (for example, a sponge). In the present embodiment, buffer part 60 is configured as cushion materials 61 and 62 provided in both of side surface parts 242 and 243 each of which is a side of the housing. Buffer part 60 may be provided on a side of movable body 10, for example, in another end part 144 that is the free end part of movable body 10, so that movable body 10 comes into contact with both of side surface parts 242 and 243 at buffer part 60 when movable body 10 vibrates. In a case where buffer part 60 is an elastomer, it is possible to reduce generation of a sound or a vibration noise created when another end part 144 of core 14 of movable body 10 comes into contact with side surface parts 242 and 243 during driving of movable body 10.

Further, in a case where buffer part 60 is a silicone rubber, generation of a sound or a vibration noise created when another end part 144 of core 14 of movable body 10 comes into contact with side surface parts 242 and 243 can be reduced. In addition, in a case where buffer part 60 is a silicone rubber, no individual difference occurs in the thickness of buffer part 60 in comparison with a case where buffer part 60 is an elastomer formed by a sponge-like material containing bubbles inside. Accordingly, it is possible to easily manage the thickness of buffer part 60 such that buffer part 60 has a desired thickness, and to ensure stability of characteristics as buffer part 60.

The magnets (first magnet 30 and second magnet 40) move movable body 10 by cooperation with coil 12. The magnet functions as a magnetic spring by means of a magnetic attraction force with respect to movable body 10. In the present embodiment, the magnet and core 14 around which coil 12 is wound form the magnetic spring to movably support movable body 10.

The magnets are arranged to face each other in the axial direction of coil 12 with respect to coil 12.

In the present embodiment, the magnets include first magnet 30 away from and facing one end part of core 14 in the axial direction of coil 12, and second magnet 40 away from and facing another end part of core 14 in the axial direction of coil 12.

Each of first magnet 30 and second magnet 40 is magnetized toward core 14 (movable body 10). In the present embodiment, the magnetization directions of first magnet 30 and second magnet 40 are parallel to the axial direction of coil 12. Each of first magnet 30 and second magnet 40 includes, each as a surface on a side facing core 14, two different magnetic poles arranged in a direction (corresponding to the vibration direction of movable body 10) orthogonal to the extending direction of shaft part 50.

The magnetic poles are disposed such that a center of core 14 of movable body 10 (here, the center is on an axis of coil 12 and corresponds to a center of the magnetic poles when coil 12 is excited) is located to face a boundary between the magnetic poles, that is, a switching position of the magnetic poles.

The polarities of the magnetic poles of both of first magnet 30 and second magnet 40 are magnetized such that torque to be generated by exciting coil 12 of movable body 10 is generated in the same rotational direction as that of movable body 10.

For example, as illustrated in FIGS. 5, 6A and 6B, in first magnet 30 and second magnet 40, magnetic poles 301 and 401 each of which is disposed on a side of side surface part 242 and faces movable body 10 are each formed so as to be the same pole (the S pole in FIG. 5). Further, in first magnet 30 and second magnet 40, magnetic poles 302 and 402 each of which is disposed on a side of side surface part 243 and faces movable body 10 are each formed so as to be the same pole (the N pole in FIG. 5).

First magnet 30 includes a rear surface on which back yoke 32 is bonded, and second magnet 40 includes a rear surface on which back yoke 42 is bonded, so that an improvement in an magnetic attraction force of each of first magnet 30 and second magnet 40 is achieved.

For example, it is supposed that magnetization is performed in first magnet 30 and second magnet 40 such that the S pole is on the side of side surface part 242 and the N pole is on the side of side surface part 243. In this case, a magnetic flux emitted from the N pole and incident on the S pole is formed at first magnet 30 and second magnet 40, respectively, when coil 12 is not energized as illustrated in FIG. 5. When energization is not performed, one end part 142 of core 14 around which coil 12 is wound is attracted to both the S and N poles of first magnet 30, and is held at a switching position of magnetic poles 301 and 302 that are different from each other (the S and N poles), and further another end part 144 of core 14 is attracted to both the S and N poles of second magnet 40, and is held at a switching position of magnetic poles 401 and 402 that are different from each other (the S and N poles). First magnet 30 and second magnet 40, together with core 14 that is a magnetic body of movable body 10, function as a magnetic spring by means of magnetic attraction forces generated between first magnet 30 and second magnet 40 and core 14 to movably support movable body 10.

Another end part 154 of flexible substrate 15 that is connected to coil 12 with one end part 152 is fixed to side surface part 243.

One end part 152 of flexible substrate 15, which is connected to coil 12, is fixed to one end part of movable body 10. Another end part 154 of flexible substrate 15 is fixed to fixing body 20, here, to side surface part 243. Another end part 154 is, while being partially exposed to an outer surface of the housing, fixed to side surface part 243. When movable body 10 moves, the movement range near shaft part 50 is smaller than in a portion on the side of the other end of movable body 10. For this reason, a load applied to curved part 156 of flexible substrate 15 disposed near shaft part 50 is reduced. Thus, since flexible substrate 15 is fixed near shaft part 50, it is possible to minimize displacement of flexible substrate 15 and to prevent disconnection due to a stress generated during movement.

Note that, it may be configured such that, for example, an elastic member such as an elastic adhesive or an elastic adhesive tape is interposed between one end part 152 of flexible substrate 15 and movable body 10 and absorbs an impact created during vibration.

[Magnetic Circuit of Vibration Actuator 1]

Figure 7:
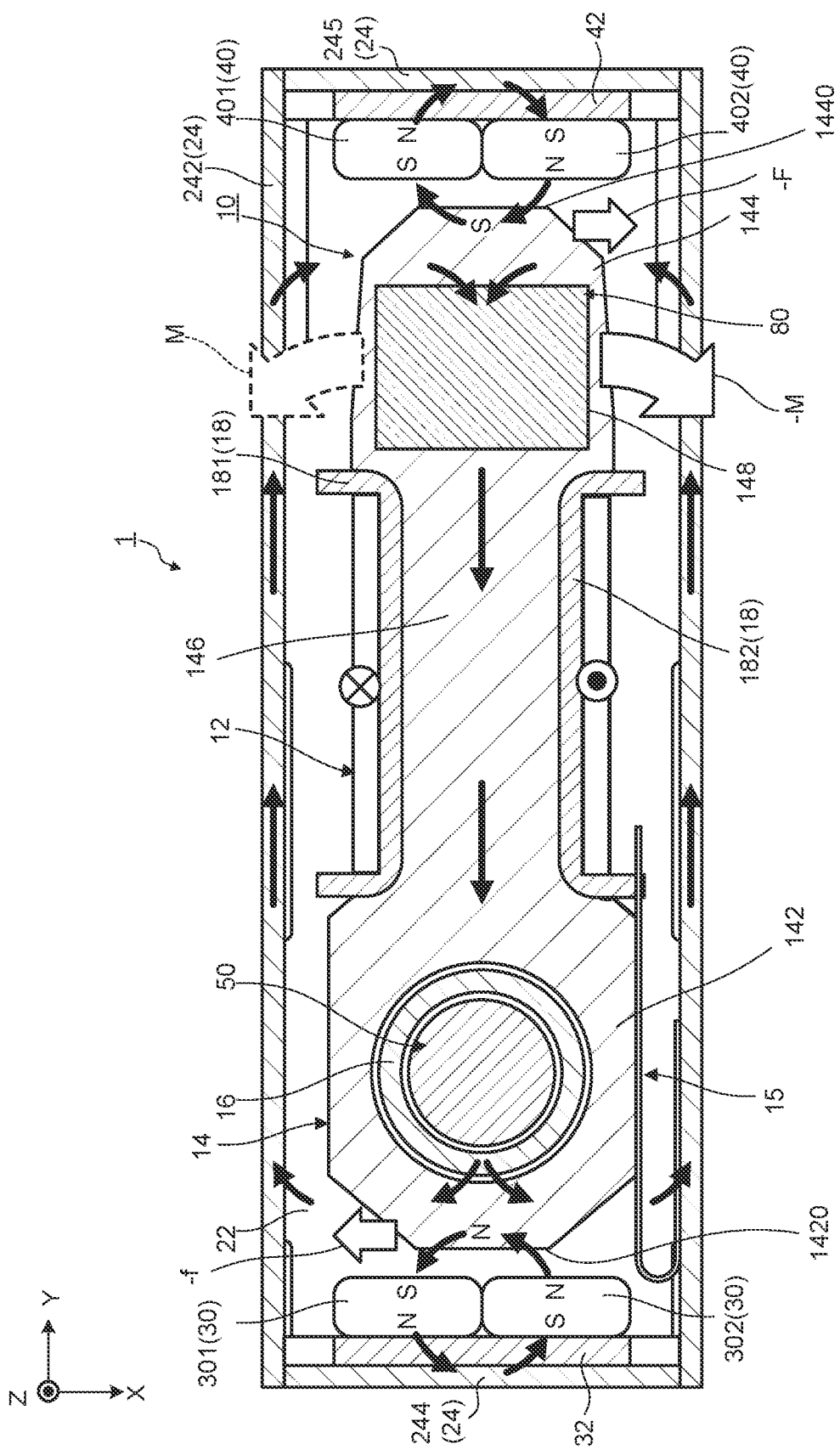
FIG. 7 is a plane cross-sectional view illustrating a magnetic circuit of the vibration actuator.

FIG. 7 illustrates a magnetic circuit of the vibration actuator, illustrating a state in which vibration actuator 1 is viewed from the plus side in the Z direction (upper side) to the minus side in the Z direction (lower side). FIGS. 8A to 8C are longitudinal cross-sectional views illustrating operation of the movable body, each illustrating a state in which vibration actuator 1 is viewed from the plus side in the Z direction (upper side) to the minus side in the Z direction (lower side). FIG. 8A illustrates a state of movable body 10 when energization is not performed (reference state). FIG. 8B illustrates a state of movable body 10 when coil 12 is energized clockwise when viewing vibration actuator 1 from a side of a leading end part of movable body 10, that is, the side of another end part 144 of core 14. FIG. 8C illustrates a state of movable body 10 when coil 12 is energized counterclockwise when viewing vibration actuator 1 from the side of the leading end part of movable body 10, that is, the side of another end part 144 of core 14.

In vibration actuator 1, movable body 10 is disposed in a state in which the side of the one end of movable body 10 is supported via shaft part 50 between base plate 22 and case 2 of fixing body 204. In addition, the magnets (first magnet 30 and second magnet 40) are disposed to face the both end parts (one end part 142 and another end part 144) of core 14 around which coil 12 is wound, with the two different magnetic poles of each magnet being directed toward a side of coil 12, in the axial direction of coil 12 of movable body 10. Magnetic pole 301 of first magnet 30 and magnetic pole 401 of second magnet 40 are the same pole, and magnetic pole 302 of first magnet 30 and magnetic pole 402 of second magnet 40 are the same pole.

In each magnet of first magnet 30 and second magnet 40, magnetic poles 301 and 302 that are two different magnetic poles are arranged side by side in the vibration direction (the X direction) orthogonal to the axial direction of shaft part 50, and magnetic poles 401 and 402 that are two different magnetic poles are arranged side by side in the vibration direction (the X direction) orthogonal to the axial direction of shaft part 50.

Figure 22:
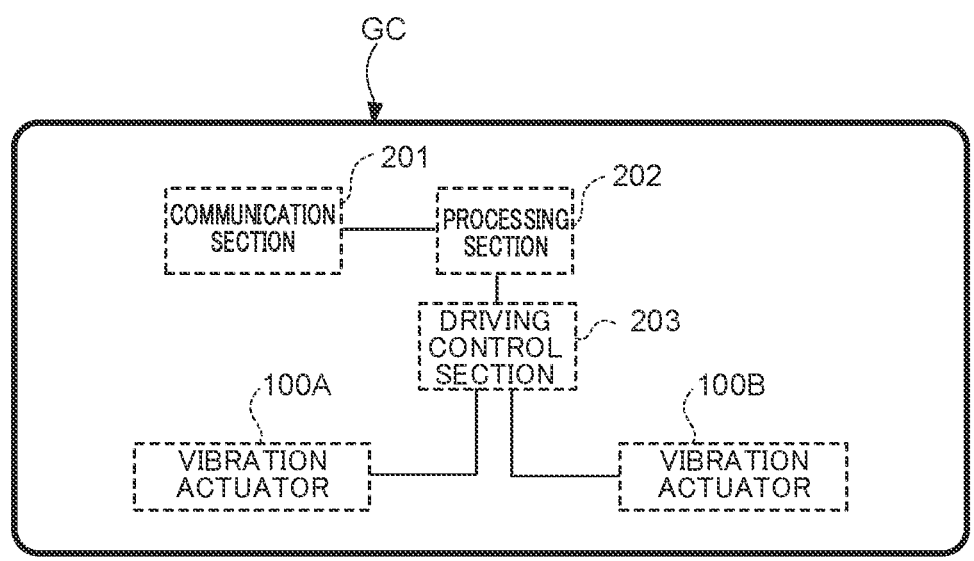
FIG. 22 illustrates a game apparatus which is an example of an electronic apparatus in which the vibration actuator is mounted.
Figure 23:
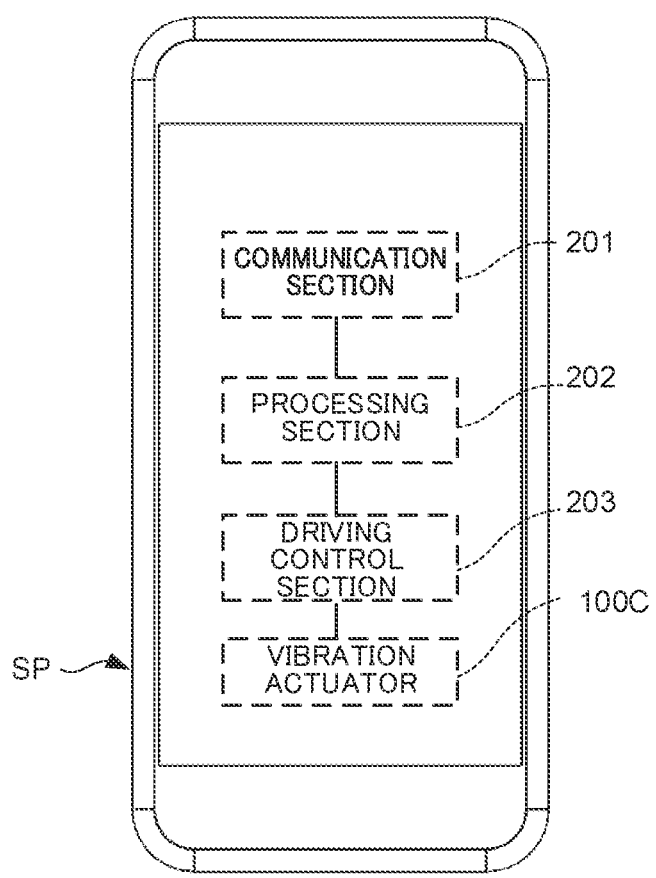
FIG. 23 illustrates a portable information terminal which is an example of the electronic apparatus in which the vibration actuator is mounted.
Figure 24:
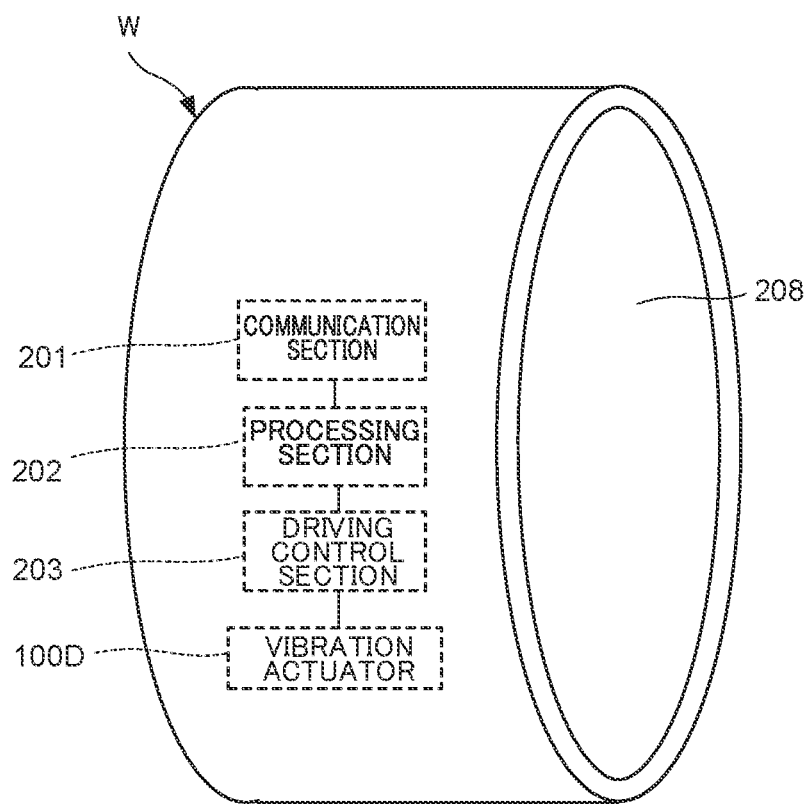
FIG. 24 illustrates a wearable terminal which is an example of the electronic apparatus in which the vibration actuator is mounted.

Movable body 10 reciprocates in the X direction, that is, in a direction in which movable body 10 comes into contact with or is separated from side surface part 242 or 243 of case 24, by energization of coil 12 via flexible substrate 15 from a power supply section (for example, driving control section 203 illustrated in FIGS. 22 to 24).

Specifically, another end part of movable body 10 sways. In this way, a vibrational output of vibration actuator 1 is transmitted to a user of an electronic apparatus including vibration actuator 1.

The magnetic circuit illustrated in FIG. 7 is formed in vibration actuator 1.

In vibration actuator 1, when coil 12 is not energized, that is, in the reference state, the both end parts (one end part 142 and another end part 144) of core 14 around which coil 12 is wound are attracted to first magnet 30 and second magnet 40, respectively.

A center of a length (length in the vibration direction) orthogonal to each axial direction of the both end parts (one end part 142 and another end part 144) of core 14 is located at a position facing the switching position of the magnetic poles of the magnet. Note that, the center of the length (length in the vibration direction) orthogonal to each axial direction of the both end parts (one end part 142 and another end part 144) is located on the same axis as the axis of coil 12.

Specifically, one end part 142 of core 14 is attracted by magnetic attraction forces of both of magnetic poles 301 and 302, which are different from each other, of first magnet 30, and is held at the switching position of magnetic poles 301 and 302.

Further, another end part (free end part) 144 of core 14 is attracted by magnetic attraction forces of both of magnetic poles 401 and 402, which are different from each other, of second magnet 40, and is held at the switching position of magnetic poles 401 and 402.

Thus, movable body 10 is held in the reference state only by the magnetic spring formed of first magnet 30 and second magnet 40 of fixing body 20.

In vibration actuator 1, coil 12 is disposed so as to be along and away from magnetic fluxes from first magnet 30 and second magnet 40.

With this configuration, when energization is performed as illustrated in FIGS. 7 and 8B, the both end parts (one end part 142 and another end part 144) of core 14 are magnetized so as to be magnetic poles different from each other by a current flowing through coil 12. Specifically, one end part 142 is magnetized to the N pole, and another end part 144 is magnetized to the S pole.

Thus, one end part 142 is attracted to magnetic pole 301 of first magnet 30 and repels magnetic pole 302 of first magnet 30 to generate thrust f, and moves in a direction of thrust f. On the other hand, another end part 144 repels magnetic pole 401 of second magnet 40, is attracted to magnetic pole 402 of second magnet 40, and moves in a direction of thrust −F.

As illustrated in FIG. 8B, in vibration actuator 1, the both end parts (one end part 142 and another end part 144) located with shaft part 50 therebetween move in the directions of thrust f and thrust −F, respectively, by energizing coil 12, thereby generating thrust −M that is the same rotational direction. Thus, movable body 10 rotates around shaft part 50 in a direction of thrust −M, and another end part 144 of movable body 10 moves onto the side of side surface part 243, comes into contact (specifically, collides) with side surface part 243, that is, the housing via cushion material 62, and imparts vibration to the housing.

Further, when the energization direction of coil 12 is switched to the opposite direction and energization is performed as illustrated in FIG. 8C, thrust −f and thrust F whose directions are opposite to each other are generated. Specifically, one end part 142 is magnetized to the S pole, and another end part 144 is magnetized to the N pole. Thus, one end part 142 repels magnetic pole 301 of first magnet 30 and is attracted to magnetic pole 302 of first magnet 30 to generate thrust −f, and moves in a direction of thrust −f. On the other hand, another end part 144 is attracted to magnetic pole 401 of second magnet 40, repels magnetic pole 402 of second magnet 40, and moves in a direction of F.

As illustrated in FIG. 8C, in vibration actuator 1, the both end parts (one end part 142 and another end part 144) located with shaft part 50 therebetween move in the directions of thrust −f and thrust F, respectively, by energizing coil 12, thereby generating thrust M that is the same rotational direction. Thus, movable body 10 rotates around shaft part 50 in a direction of thrust M, and another end part 144 of movable body 10 moves onto the side of side surface part 242 opposite to side surface part 243, comes into contact (specifically, collides) with side surface part 242, that is, the housing via cushion material 61, and imparts vibration to the housing.

In vibration actuator 1, movable body 10 is supported such that movable body 10 is capable of reciprocatingly and rotationally vibrating around shaft part 50 with respect to fixing body 20 only by means of the magnetic spring using the magnet (at least second magnet 40) and core 14, without using an elastic member such as a plate spring.

Accordingly, unlike a vibration actuator configured to support a movable body such that the movable body is capable of vibrating by a metal spring as in the related art, it is possible to prevent damage due to metal fatigue or impact, which represents a problem specific to metal springs.

Further, shaft part 50 supports movable body 10 such that movable body 10 is capable of swaying on the side of one end part 142 of core 14 of movable body 10, and weight part 80 made of a high specific gravity material is attached to notch 148 obtained by notching a part on the side of another end part 144 of core 14. Weight part 80 is provided in notch 148 such that movement of weight part 80 in the vibration direction within notch 148 is regulated. Thus, weight part 80 is provided as a part of core 14 in movable body 10 in a state in which four sides of weight part 80 are surrounded. Core 14 becomes the entire length of movable body 10 that sways, and forms the movable body-main body. The four sides of weight part 80 are in the moving direction of movable body 10 during reciprocating and rotational movement.

That is, it is possible to increase, without changing the size of movable body 10, the mass of the leading end part (another end part) of movable body 10 such that weight part 80 is not detached from movable body 10. Thus, vibration actuator 1 makes it possible to increase inertia without lowering the resonance point in a state in which the magnetic characteristics are maintained.

Further, in the present embodiment, the magnet is disposed as first magnet 30 and second magnet 40 on both sides of core 14. Magnetic poles 301 and 302 that are two magnetic poles, and magnetic poles 401 and 402 that are two magnetic poles are disposed, respectively, such that torque to be generated in each of end parts 142 and 144 of movable body 10 is generated in the same rotational direction. In the both end parts (one end part 142 and another end part 144) of core 14, magnetic attraction forces are generated between core 14 and first magnet 30 and second magnet 40, and core 14 and first magnet 30 and second magnet 40 attract each other.

Thus, when movable body 10 is moved by cooperation between first magnet 30 and second magnet 40 and coil 12, a load applied to shaft part 50 due to magnetic attraction forces is offset, and it is possible to reduce a load applied to shaft part 50 and bushing 16.

Further, in the housing, movable body 10 comes into contact (is in a state corresponding to a state of coming into contact) with side surface part 242 or 243 of the housing so that vibration can be directly transmitted to the vibration actuator-housing and a large vibration can be generated from vibration actuator 1 itself. In addition, since movable body 10 comes into contact with fixing body 20 (housing) when movable body 10 vibrates, the amount of vibration also becomes constant, and a stable vibrational output can be realized as vibration actuator 1.

Note that, another end part 144 of core 14, which is the free end part of movable body 10, is formed such that the thickness thereof in the X direction becomes thinner toward a side of the free end. Thus, the movement range of movable body 10 when another end part 144 sways and comes into contact with cushion material 61 or 62 is wider in comparison with a case where another end part 144 of core 14, which is the free end part of movable body 10, has the same thickness in the X direction toward the side of the free end. Accordingly, vibration actuator 1 is capable of ensuring a larger vibrational output.

Further, according to vibration actuator 1, buffer part 60 is provided in inner wall surfaces (side surface parts 242 and 243) of case 24, and the inner wall surfaces of case 24 come into contact with movable body 10 via buffer part 60 (cushion materials 61 and 62). Buffer part 60 is capable of alleviating an impact when movable body 10 vibrates to come into contact with base plate 22 or case 24, and is capable of, while reducing generation of a contact sound or a vibration noise, transmitting vibration to a user. Further, since movable body 10 alternately comes into contact (specifically, collides) with base plate 22 and case 24 via buffer part 60 every time movable body 10 vibrates, the vibrational output is amplified. Thus, a user can physically feel a vibrational output greater than an actual vibrational output by movable body 10.

Here, vibration actuator 1 is driven by an AC wave that is input from the power supply section (for example, driving control section 203 illustrated in FIGS. 22 to 24) to coil 12 via flexible substrate 15. That is, the energization direction of coil 12 is switched periodically, and thrust M on the plus side in the X direction and thrust −M on the minus side in the X direction alternately act on movable body 10. Thus, the side of the other end of movable body 10 vibrates in a circular arc shape within the XY plane.

Hereinafter, a brief description will be given of the driving principle of vibration actuator 1. In vibration actuator 1 of the present embodiment, movable body 10 vibrates with respect to fixing body 20 at resonance frequency $f_r$ [Hz] calculated by following equation 1 where J [kg·m²] represents the moment of inertia (inertia) of movable body 10 and $K_{sp}$ represents the spring constant of the magnetic spring in the torsion direction.

[1]

$$f_r = \frac{1}{2\pi}\sqrt{\frac{K_{sp}}{J}}$$ (Equation 1)

$f_r$: Resonance frequency [Hz]
J: Moment of inertia [kg·m²]
$K_{sp}$: Spring constant [N·m/rad]

Since movable body 10 forms a mass part in a vibration model of a spring-mass system, movable body 10 is brought into a resonance state when an AC wave of a frequency equal to resonance frequency $f_r$ of movable body 10 is input to coil 12. That is, movable body 10 can be efficiently vibrated by inputting an AC wave of a frequency, which is substantially equal to resonance frequency $f_r$ of movable body 10, from the power supply section (for example, driving control section 203 illustrated in FIGS. 22 to 24) to coil 12.

The equation of movement and the circuit equation representing the driving principle of vibration actuator 1 are indicated below. Vibration actuator 1 is driven based on the equation of movement represented by following equation 2 and on the circuit equation represented by following equation 3.

[2]

$$J\frac{d^2\theta(t)}{dt^2} = K_t i(t) - K_{sp}\theta(t) - D\frac{d\theta(t)}{dt}$$ (Equation 2)

J: Moment of inertia [kg·m²]
θ(t): Angle [rad]
$K_t$: Torque constant [N·m/A]
i(t): Current [A]
$K_{sp}$: Spring constant [N·m/rad]
D: Damping coefficient [N·m/(rad/s)]

[3]

$$e(t) = Ri(t) + L\frac{di(t)}{dt} + K_e\frac{d\theta(t)}{dt}$$ (Equation 3)

e(t): Voltage [V]
R: Resistance [Ω]
L: Inductance [H]
$K_e$: Counter electromotive force constant [V/(rad/s)]

That is, moment of inertia (inertia) J [kg·m²], angle of rotation θ(t) [rad], torque constant $K_t$ [N·m/A], current i(t) [A], spring constant $K_{sp}$ [N·m/rad], damping coefficient D [N·m/(rad/s)], and the like of movable body 10 in vibration actuator 1 can be changed appropriately as long as equation 2 is satisfied. Further, voltage e(t) [V], resistance R [Ω], inductance L [H], and counter electromotive force constant $K_e$ [V/(rad/s)] can be changed appropriately as long as equation 3 is satisfied.

As described above, in vibration actuator 1, a great vibrational output can be efficiently obtained in a case where coil 12 is energized using an AC wave corresponding to resonance frequency $f_r$ determined by moment of inertia (inertia) J of movable body 10 and spring constant $K_{sp}$ of the magnetic spring.

<Variation 1>

FIGS. 9A and 9B are cross-sectional views illustrating a configuration of principal parts of Variation 1 of the movable body in the vibration actuator of Embodiment 1. Specifically, FIG. 9A is a longitudinal cross-sectional view of the movable body, which is provided for describing the movable body of Variation 1. FIG. 9B is a cross-sectional view of another end part of a core of Variation 1 of the vibration actuator, illustrating the same part as the portion indicated by the cross section taken along line B-B in FIG. 3.

In comparison with the movable body of vibration actuator 1, movable body 10A of Variation 1 in the vibration actuator illustrated in FIGS. 9A and 9B differs in that the shape of weight part 80A provided in another end part (leading end part) 144A of core 14A is changed.

That is, in movable body 10A, the shape of notch 148A provided in another end part 144A of core 14A is a through-hole penetrating in the Z direction and weight part 80A is attached within the through-hole in the configuration of vibration actuator 1.

Movable body 10A of Variation 1 of FIGS. 9A and 9B includes core 14A having the same configuration as core 14, bushing 16 into which shaft part 50 (see FIG. 2) is inserted is inserted on a side of one end part 142A of core 14A, and weight part 80A is provided on a side of another end part 144A.

Coil 12 is wound around an outer periphery of core part 146A between one end part 142A and another end part 144A via coil bobbin 18.

Notch 148A provided in another end part 144A is a through-hole formed to penetrate in a direction (the Z direction) orthogonal to both the vibration direction and an extending direction of core 14A.

Weight part 80A is fixed within the through-hole (notch 148A) such that the center of gravity of weight part 80A is located on the axis of core part 146A.

Thus, movable body 10A can achieve the same operation and effect as movable body 10 including weight part 80 in Embodiment 1.

Figure 10:
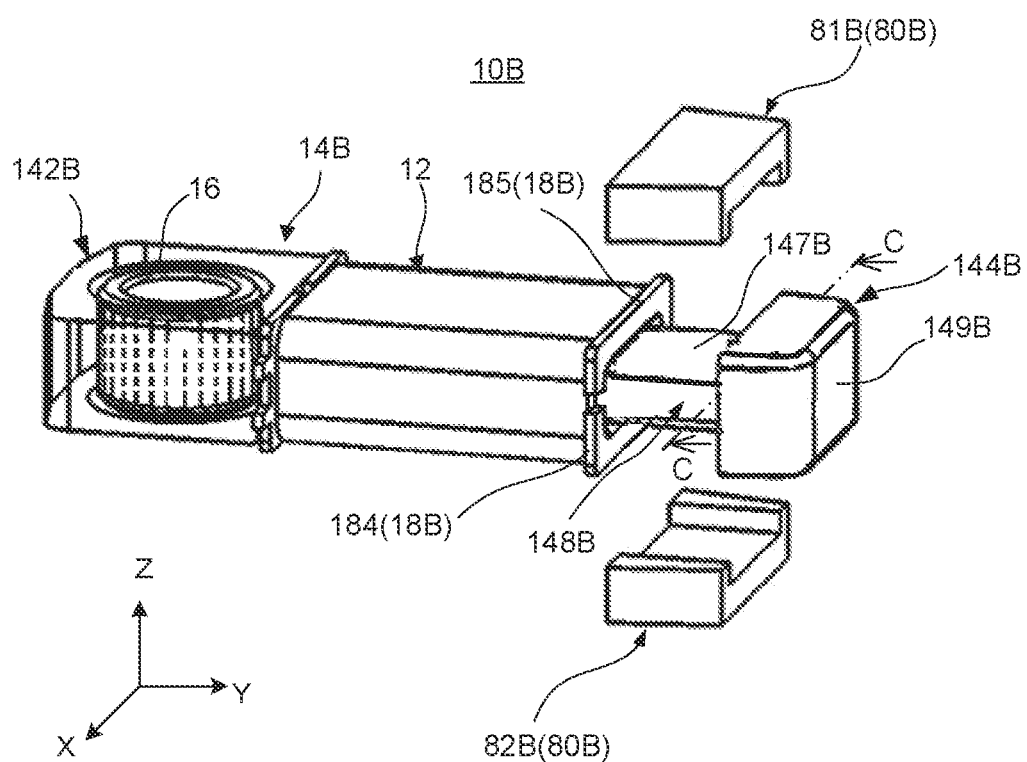
FIG. 10 is a partially exploded perspective view illustrating a configuration of principal parts of Variation 2 of vibration actuator 1.
Figure 11:
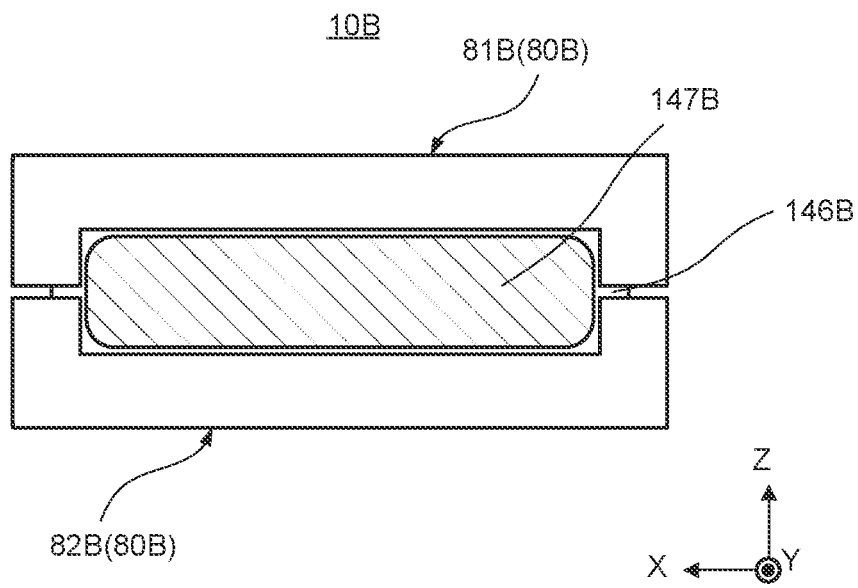
FIG. 11 is a cross-sectional view taken along line C-C in FIG. 10.

FIG. 10 is a partially exploded perspective view illustrating a configuration of principal parts of Variation 2 of the vibration actuator. FIG. 11 is a cross-sectional view taken along line C-C in FIG. 10.

In comparison with movable body 10 of vibration actuator 1, the shape of weight part 80B and the shape of leading end part 144B of core 14B corresponding thereto are different in movable body 10B of Variation 2 illustrated in FIG. 10. That is, in movable body 10B, weight part 80B is formed of divided bodies 81B and 82B.

Divided bodies 81B and 82B are formed so as to surround a periphery of extended core part 147B, and are formed of a high specific gravity material such as tungsten, respectively.

In core 14B, extended core portion 147B is disposed on an extension of core part 146B around which coil 12 is wound, and is formed to be continuous with core part 146B.

Note that, an outer periphery of core part 146B is surrounded by bobbin 18B formed by combining divided bobbin bodies 184 and 185 that are divided in the width direction. Coil 12 is wound around bobbin 18B.

Extended core part 147B is provided together with notch 148B in a part of another end part 144B among one end part 142B, core part 146B, and another end part 144B that are continuous in the longitudinal direction in core 14B.

Extended core portion 147B, notch 148B, and head part 149B which is a free end form another end part 144B of core 14B. It can be said that in another end part 144B, weight part 80B is attached within notch 148B.

Divided bodies 81B and 82B are formed in a cross-sectional U shape or in an L-shape. When divided bodies 81B and 82B have the same shape, it is possible to reduce the manufacturing cost of weight part 80B.

Divided bodies 81B and 82B are attached so as to hold extended core part 147B therebetween and so as to surround extended core part 147B.

Divided bodies 81B and 82B are fixed to extended core part 147B by press-fitting, via an adhesive, or the like. Divided bodies 81B and 82B are disposed in a recessed portion between a portion on core 14B, around which coil 12 is wound, and head part 149B, and are provided so as to surround extended core part 147B. Thus, even when a centrifugal force is generated by the turn of movable body 10B, divided bodies 81B and 82B are difficult to detach.

Weight part 80B composed of divided bodies 81B and 82B is formed such that the length thereof in the width direction, that is, the vibration direction gradually decreases toward a side of the free end, that is, a side of head part 149B. Thus, the length of another end part 144B in the width direction, which is formed by weight part 80B and head part 149B, also becomes shorter in the width direction toward the side of the free end.

Thus, movable body 10B can achieve the same operation and effect as movable body 10 including weight part 80 in Embodiment 1.

[Overall Configuration of Vibration Actuator 1C]

Figure 12:
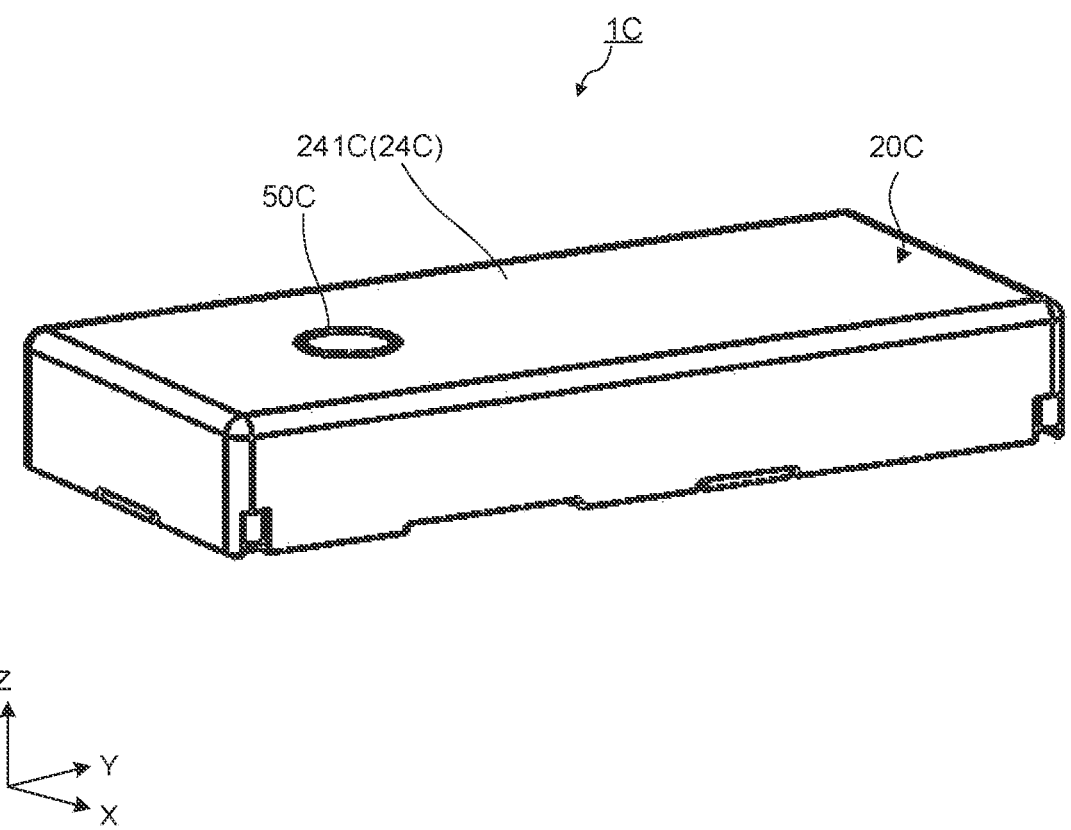
FIG. 12 is a perspective view of an external appearance of a vibration actuator according to Embodiment 2 of the present invention.
Figure 13:
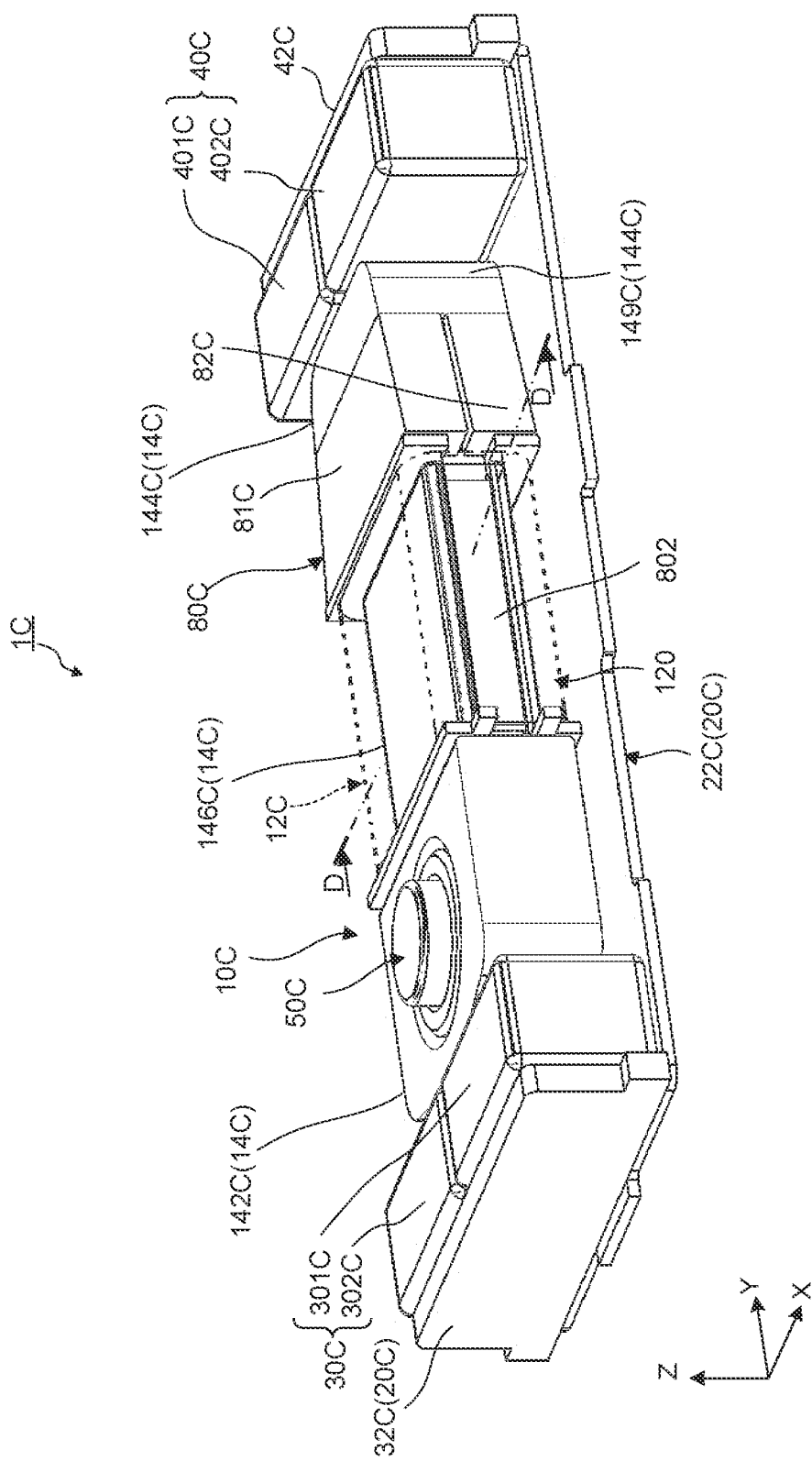
FIG. 13 is a perspective view of the vibration actuator in a state in which a case of the vibration actuator is detached.
Figure 14:
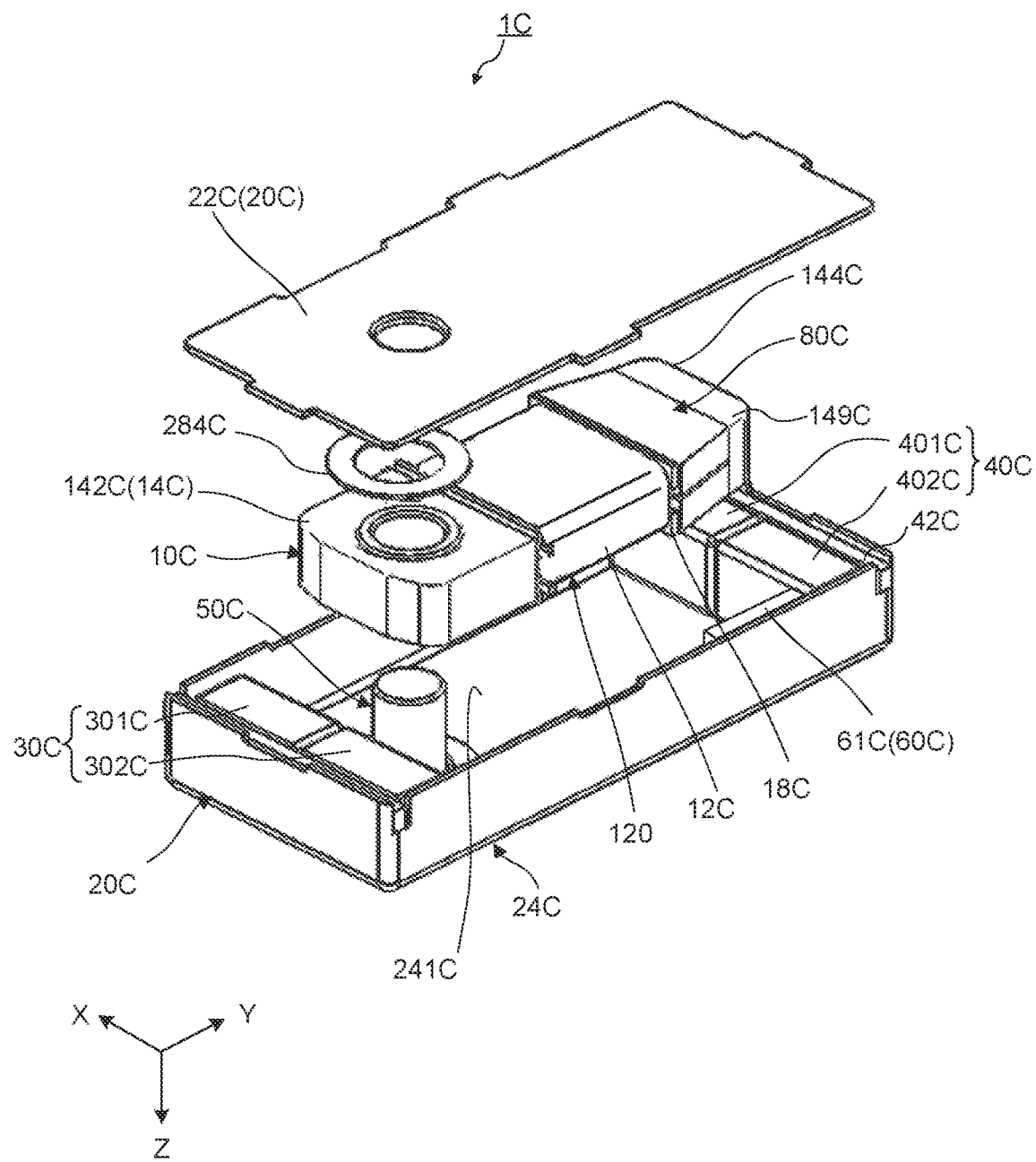
FIG. 14 is an exploded view of the vibration actuator in a state in which a movable body is detached from a fixing body.

FIG. 12 is a perspective view of an external appearance of a vibration actuator according to Embodiment 2 of the present invention. FIG. 13 is a perspective view of vibration actuator 1C in a state in which case 24C of vibration actuator 1C is detached. FIG. 14 is an exploded view of the vibration actuator in a state in which a movable body is detached from a fixing body.

In the present embodiment, an orthogonal coordinate system (X, Y, Z) will be used for explanation. Hereinafter, the width, depth, and height of vibration actuator 1C are lengths in X, Y, and Z directions, respectively. For convenience, in FIGS. 12 to 15, vibration actuator 1C of the present embodiment is illustrated by disposing the X direction toward a lateral direction, which will be described as a vibration direction. Further, an "axis of the movable body" in the present embodiment means the Y direction around the movable body, and a side in the Y direction and a side in the minus Y direction are also referred to as a side of a leading end and as a side of a base end, respectively. In the present embodiment, the "axis of the movable body" is the same axis as a coil center axis. Note that, the X direction and the minus X direction may be set as both sides, the plus side in the Z direction may be set as an upper side, and the minus side in the Z direction may be set as a lower side.

Vibration actuator 1C illustrated in FIGS. 12 to 14 includes movable body 10C, shaft part 50C, and fixing body 20C. Movable body 10C is supported by fixing body 20C via shaft part 50C.

Figure 15:
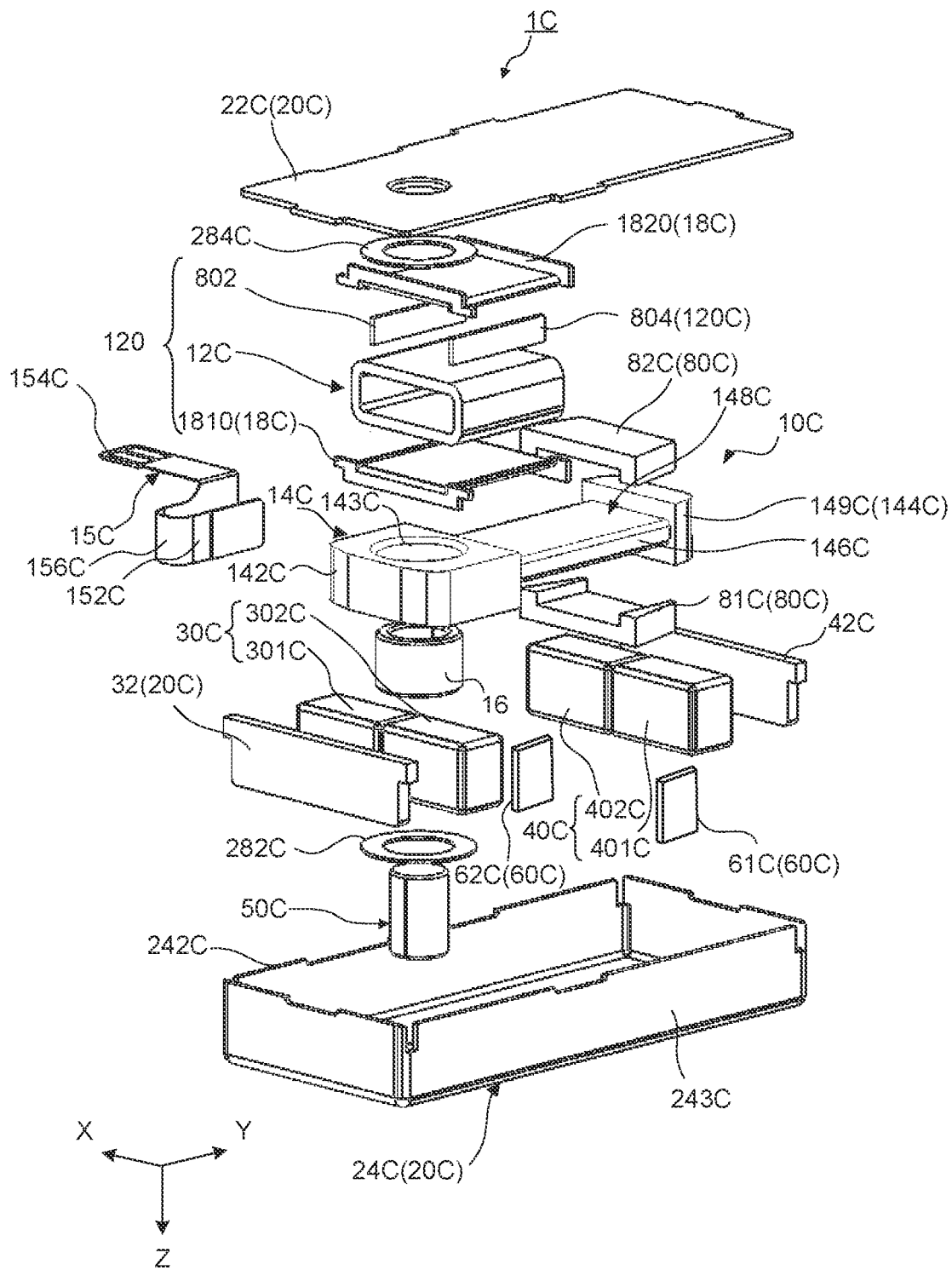
FIG. 15 is an overall exploded perspective view of the vibration actuator.

FIG. 15 is an overall exploded perspective view of vibration actuator 1C.

Movable body 10C includes coil 12C and core 14C. Fixing body 20C includes magnets (first magnet 30C and second magnet 40C).

In order that a side of another end of movable body 10C reciprocates while shaft part 50C inserted through movable body 10C on a side of one end thereof serves as a fulcrum, movable body 10C is turnably supported with respect to fixing body 20C in the X direction or in the minus X direction. Vibration actuator 1C includes, as parts of a portion forming a main body of movable body 10C, main weight part 80C for a notch, and coil-side weight parts 802 and 804 on a side of the coil. In the present embodiment, coil-side weight parts (covering side wall parts) 802 and 804 other than main weight part (notch weight part) 80C are provided inside coil 12C in movable body 10C, thereby increasing inertia. Main weight part 80C, and coil-side weight parts 802 and 804 are formed of a material having a higher specific gravity than that of core 14C. Further, a weight part may be provided in a part of core 14C serving as the main body of movable body 10C.

Fixing body 20C turnably houses movable body 10C in a housing including base plate 22C and case 24C. Case 24C covers base plate 22C and functions as a cover. When coil 12C is not energized, fixing body 20C movably supports movable body 10C at a neutral position (rotational center position) between movement in the X direction and movement in the minus X direction via a magnetic spring by means of a magnetic attraction force of the magnets (first magnet 30C and second magnet 40C).

That is, movable body 10C is supported by a magnetic spring formed of the magnets (first magnet 30C and second magnet 40C), core 14C, and coil 12C such that when energization is not performed, both end parts of movable body 10C are located at neutral positions, respectively, when movable body 10C rotates in the plus and minus X directions. Movable body 10C is located in case 24 so as to extend parallel to the longitudinal direction of case 24, and thereby is located at a reference position which is the neutral position (the rotational center position, also referred to as "sway center position"). Movable body 10C is movably supported around shaft part 50C with respect to fixing body 20C.

Note that, the magnet of the magnetic spring may be at least one of first magnet 30C and second magnet 40C, and may be only second magnet 40C.

[Configuration of Shaft Part 50C]

Figure 16:
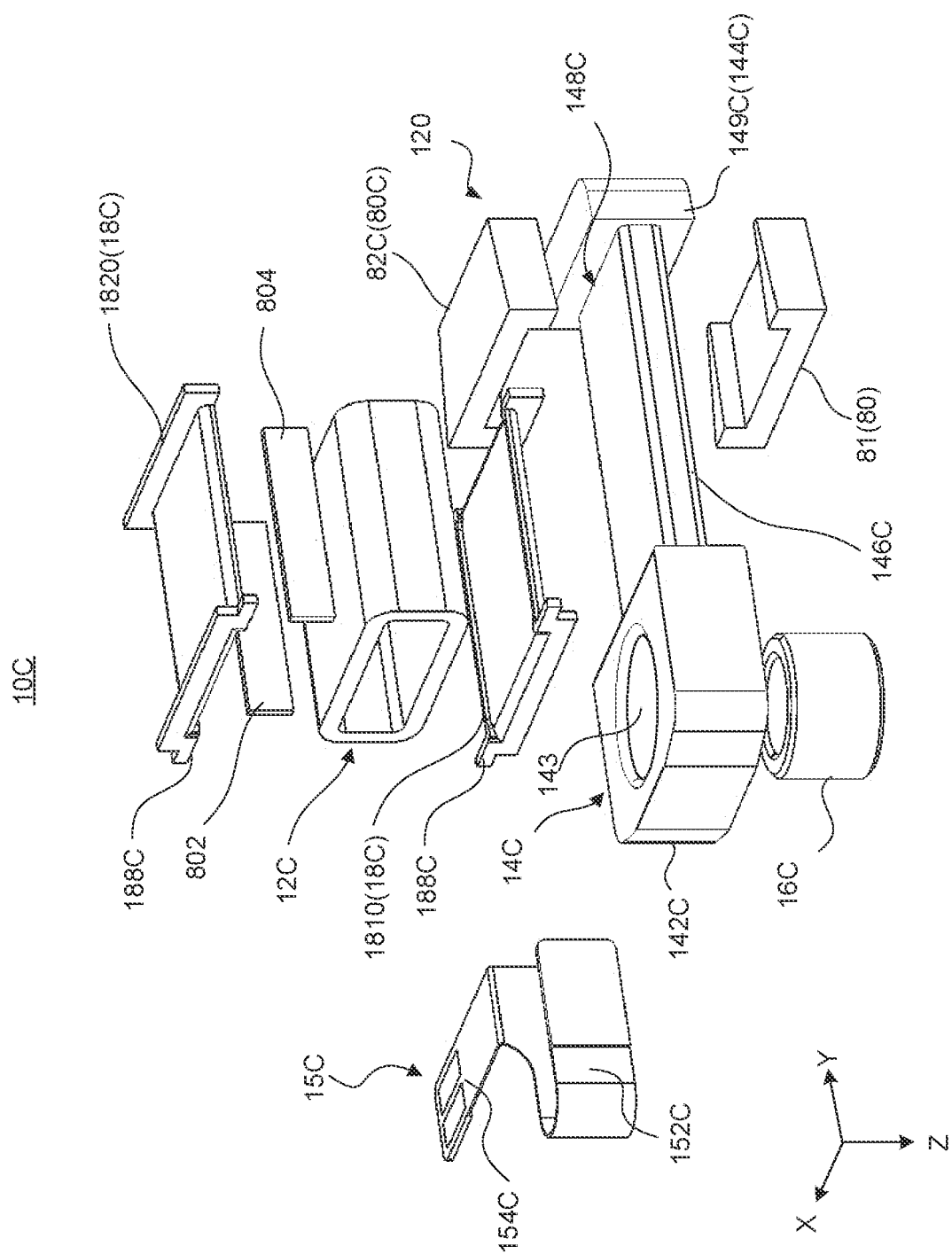
FIG. 16 is an exploded perspective view of the movable body of the vibration actuator.

FIG. 16 is an exploded perspective view of the movable body of the vibration actuator. In the housing, shaft part 50C turnably supports movable body 10C on a side of one end part 142C.

Shaft part 50C is disposed between base plate 22C and upper surface part 241C of case 24C. Base plate 22C and case 24C are disposed to face each other so as to hold movable body 10C therebetween. Washer 282C that is externally applied to shaft part 50C is interposed between upper surface part 241C of case 24C and movable body 10C, and washer 284C that is externally applied to shaft part 50C is interposed between base plate 22C and movable body 10C.

By washers 282C and 284C described above, shaft part 50C supports movable body 10C such that movable body 10C smoothly reciprocates and rotates with respect to fixing body 20C. Shaft part 50C may be formed of either a non-magnetic body or a magnetic body. In the present embodiment, shaft part 50C is formed of a magnetic body such as SUS420J2 which is martensitic stainless steel, for example.

[Configuration of Movable Body 10C]

Movable body 10C includes, as parts of core 14C forming a movable body-main body, main weight part 80C and coil-side weight parts 802 and 804. For example, by fixing main weight part 80C and coil-side weight parts 802 and 804 on a side of core 14C, movable body 10C increases inertia without affecting the magnetic spring constant and torque without magnetic flux saturation. Hereinafter, movable body 10C will be specifically described.

Movable body 10C includes, in addition to main weight part 80C, core 14C, bushing (bearing) 16C, and coil body 120. Core 14C extends from a side of one end (a side of a base end) of movable body 10C to a side of another end (a side of a leading end) thereof. Bushing (bearing) 16C is a bearing provided on a side of one end of core 14C. Coil body 120 includes coil 12C.

Movable body 10C has a predetermined length and is pivotally supported by shaft part 50C, which is inserted into bushing 16C, in one end part 142C of core 14C. The side of the leading end of another end part 144C of core 14C is configured as a free end part and is provided to be capable of swaying.

Coil body 120 is externally applied to core 14C described above between one end part 142C and another end part 144C.

Core 14C is a magnetic body which is formed to extending in a direction of a coil axis of coil 12C and which is magnetized by energizing coil 12C. Core 14C is turnably disposed between base plate 22C and upper surface part 241C of case 24C. Further, in case 24C, core 14C is provided between both of side surface parts 242C and 243C with predetermined intervals such that another end part 144C can sway. Here, the predetermined intervals refer to a space forming the sway (movement) range of movable body 10C.

Core 14C is provided to extend in a direction of a winding axis of coil 12C.

Core 14C includes core part 146C that extends so as to connect one end part 142C and free end part 149C of another end part 144C.

Core 14C may be a ferrite core. Further, core 14C may be formed of an electromagnetic stainless steel, a sintered material, an MIM (metal injection molding) material, a laminated steel plate, an electrogalvanized steel plate (SECC, with a specific gravity of 7.85), or the like.

Core 14C is provided to extend in a direction orthogonal to an axial direction of shaft part 50C. Bushing 16C is fitted into through-hole 143 formed on the side of the one end of core 14C, and core 14C turns via shaft part 50C inserted through bushing 16C. Core 14C vibrates, with the other end part thereof as the free end part, in a direction, here in the X direction, orthogonal to a direction in which base plate 22C and upper surface part 241C of case 24C extend. Base plate 22C and case 24C are fixing body 20C.

In core 14C, shaft part 50C, coil 12C, and another end part 144C which forms the free end part are arranged in this order from one end part 142C toward the side of the other end (the side of the leading end) of core 14C.

Core part 146C is a portion which extends between one end part 142C and another end part 144C (specifically, free end part 149C) and which has an outer shape smaller than the outer shapes of one end part 142C and free end part 149C (another end part 144C). In the present embodiment, core part 146C has a width in the vibration direction, and is formed in a flat plate shape with a thickness along the axial direction (the Z direction) of shaft part 50C.

In core 14C, one end part 142C, core part 146C, and free end part 149C are integrally continuous in this order from a side of a base end (one end part 142C) of core 14C to a side of a leading end (another end part 144C) thereof.

Coil body 120 having an outer shape with substantially the same size as the outer shape of one end part 142C is externally applied to a side of a base end of core part 146C so as to surround an outer periphery of the side of the base end of core part 146C. Further, main weight part 80C is provided in a portion on a side of another end part 144C of core part 146C so as to surround an outer periphery of the portion. Thus, the outer surface of coil body 120 is provided in movable body 10C so as to be planarly continuous with the outer surface of one end part 142C and the outer surface of main weight part 80C, which partially forms the outer surface of another end part 144, in the longitudinal direction. Thus, movable body 20C is formed so as to become heavy with no change in the outer size thereof.

Note that, bushing 16C has a tubular shape, causes movable body 10C to be turnable around shaft part 50C that is inserted through bushing 16C, and may be formed by any material such as a metal, such as a sintered metal, and a resin. In a case where shaft part 50C is a magnetic body, bushing 16C is preferably formed of a non-magnetic material. Further, when shaft part 50C is a non-magnetic body, bushing 16C may be formed of a magnetic body.

Thus, when one of shaft part 50C and bushing 16C is a non-magnetic body, a magnetic flux passing through core 14C does not pass between shaft part 50C and bushing 16C, and no increase in friction due to generation of a magnetic attraction force occurs between both.

That is, no friction due to a magnetic attraction force is generated between bushing 16C and shaft part 50C inserted through bushing 16C, and movable body 10C can be turned smoothly. For example, vibration actuator 1C may be formed by using a magnetic shaft having durability (for example, SUS420J2) as shaft part 50C and a copper-based sintered bearing as bushing 16C, which makes it possible to suppress a magnetic attraction force unnecessary for driving of movable body 10C and to hold movable body 10C with low friction. That is, it is possible to suppress wear due to driving of movable body 10C and to realize vibration actuator 1C with a high reliability.

Further, one end part 152C of flexible substrate 15C is fixed to one end part 142C of core 14C. Both end parts (coil wire parts at both ends) of coil 12C are connected to a circuit of flexible substrate 15C.

Flexible substrate 15C supplies power to coil 12C. In the present embodiment, flexible substrate 15C is disposed so as to connect movable body 10C and fixing body 20C.

Flexible substrate 15C includes one end part 152C, another end part 154C, and at least one curved part 156C between one end part 152C and another end part 154C. One end part 152C is connected to coil 12C of movable body 10C. Another end part 154C is fixed on a side of fixing body 20C. Curved part 156C has flexibility and is electrically connected to coil 12C from a side of one end of flexible substrate 15C. Curved part 156C is interposed between one end part 152C and another end part 154C, and has flexibility to be deformed following the vibration of movable body 10C. Curved part 156C bends in the direction orthogonal to the axial direction of shaft part 50C.

Figure 17:
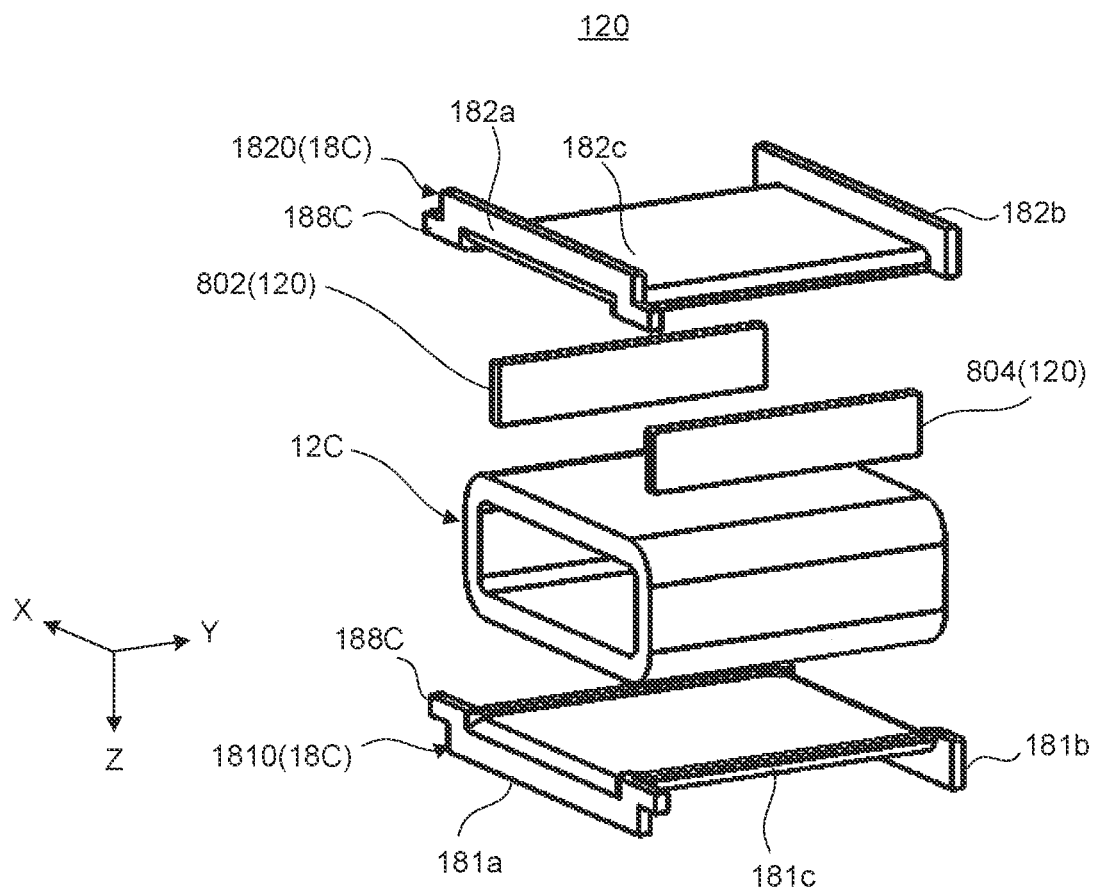
FIG. 17 is an enlarged exploded view of a coil body.
Figure 18:
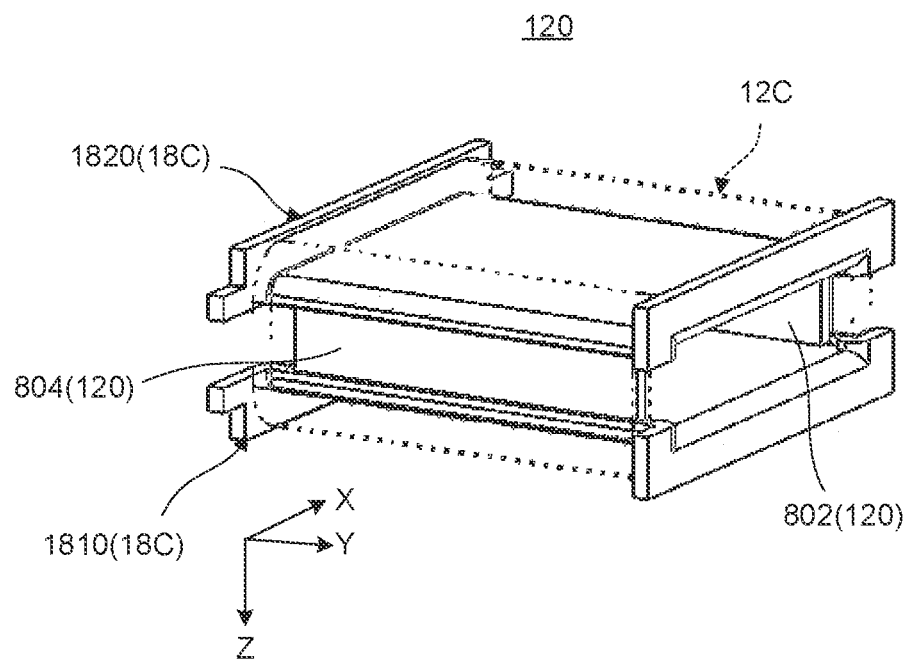
FIG. 18 is an enlarged view illustrating a configuration of principal parts of the coil body.
Figure 19:
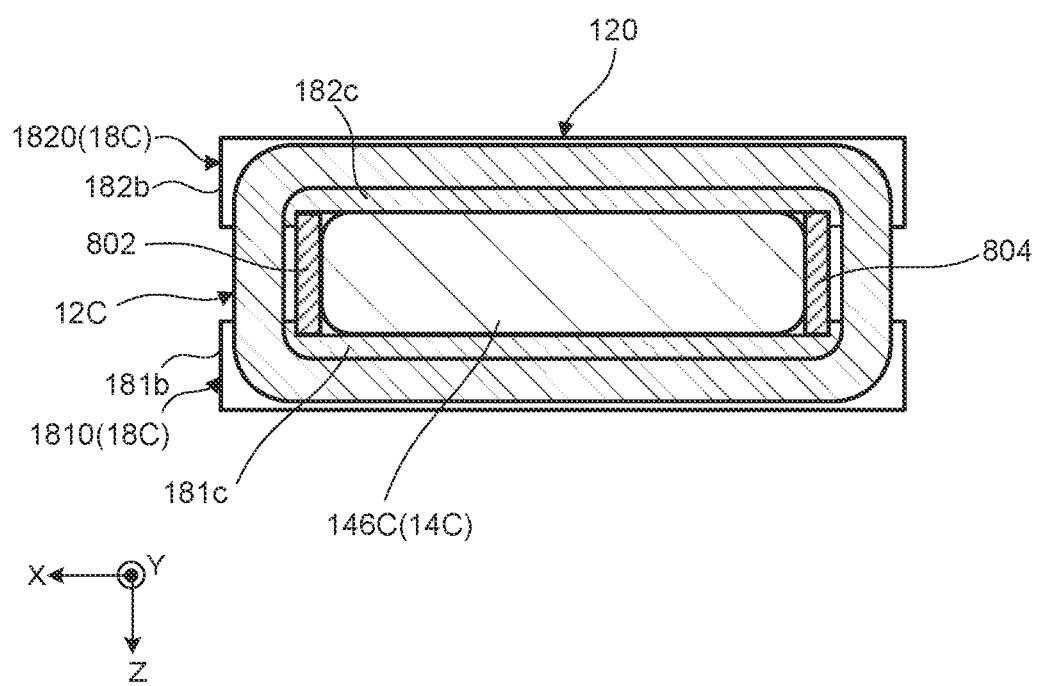
FIG. 19 is a cross-sectional view taken along line D-D and seen in a direction of arrows D in FIG. 13.

FIG. 17 is an enlarged exploded view of the coil body. FIG. 18 is an enlarged view illustrating a configuration of principal parts of the coil body. FIG. 19 is a cross-sectional view taken along line D-D and seen in a direction of arrows D in FIG. 13.

As illustrated in FIGS. 15 to 19, coil body 120 includes coil bobbin (bobbin) 18C (first divided bobbin body 1810 and second divided bobbin body 1820), coil 12C, and coil-side weight parts 802 and 804. Coil bobbin 18C is externally applied to core part 146C. Coil 12C is wound around coil bobbin 18C. Coil-side weight parts 802 and 804 are in coil 12C. That is, coil body 120 includes coil-side weight parts 802 and 804 inside coil 12C.

Coil 12C is a coil that is energized to move movable body 10C, and is energized to magnetize core 14C. Especially, one end part 142C and another end part 144C are energized to become magnetic poles. Coil 12C changes the polarities of the both end parts (one end part 142C and another end part 144C (free end part 149C)) of core 14C by switching the energization direction.

Coil bobbin 18C is formed of first divided bobbin body 1810 and second divided bobbin body 1820. First divided bobbin body 1810 includes main body surface part 181c, and flanges 181a and 181b. Second divided bobbin body 1820 includes main body surface part 182c, and flanges 182a and 182b. Main body surface parts 181c and 182c cover core part 146C from outside, here, from directions facing each other in the Z direction (the thickness direction). Flanges 181a and 181b are provided on a side of one end of main body surface part 181c and on a side of another end thereof, respectively. Flanges 182a and 182b are provided on a side of one end of main body surface part 182c and on a side of another end thereof, respectively.

First divided bobbin body 1810 and second divided bobbin body 1820 are externally applied and fixed to core part 146C so as to hold coil-side weight parts 802 and 804 therebetween from the directions facing each other in the Z direction (the thickness direction). Coil-side weight parts 802 and 804 are away from main body surface parts 181c and 182c in the vibration direction, and are disposed on sides of both side surfaces of core part 146C. Coil-side weight parts 802 and 804, and main body surface parts 181c and 182c of first divided bobbin body 1810 and second divided bobbin body 1820 are disposed in coil 12C.

Note that, first divided bobbin body 1810 and second divided bobbin body 1820 are insulators, and may be formed of a resin material such as a polyamide resin, a liquid crystal polymer, and a polyphenylene sulfide resin (PPS resin). Note that, flanges 181a and 182a on the respective sides of one end parts 142C of first divided bobbin body 1810 and second divided bobbin body 1820 are each provided with tying part 188C that ties a coil wire when coil 12C is wound. The coil wire is an end part of the coil.

Coil-side weight parts 802 and 804 are configured to make movable body 10C heavy, and are made of a high specific gravity material. Coil-side weight parts 802 and 804 in the coil are made of a material having a higher specific gravity than that of core 14C. For example, coil-side weight parts 802 and 804 are preferably formed of a material having a specific gravity twice or higher than (for example, a specific gravity of approximately 16 to 19) that of a material such as an electrogalvanized steel plate (SECC, with a specific gravity of 7.85). For example, tungsten can be applied.

Coil-side weight parts 802 and 804 may be configured any way as long as they are configured to be disposed in coil 12C. In the present embodiment, coil-side weight parts 802 and 804 are configured as both side wall parts of coil bobbin 18C surrounding core part 146C so as to be located in coil 12C in coil body 120, but the configuration of coil-side weight parts 802 and 804 is not limited thereto. Coil-side weight parts 802 and 804 may be thicker or longer, or may be provided in upper and lower wall parts of coil bobbin 18C.

In core 14C, another end part 144C protruding on a side of free end part 149C from a portion to which coil body 120 is attached includes a portion on the side of another end part 144C of core part 146C, main weight part 80C surrounding the portion, and free end part 149C.

In the same manner as in coil-side weight parts 802 and 804, main weight part 80C is configured to make movable body 10C heavy, and is made of a high specific gravity material (for example, with a specific gravity of approximately 16 to 19). For example, tungsten can be applied as main weight part 80C. Thus, even in a case where the external dimensions of movable body 10C are set in design or the like, it is possible to increase the mass of movable body 10C relatively easily, and it is possible to realize a desired vibration output without affecting the magnetic spring constant and torque without magnetic flux saturation.

Main weight part 80C is formed of divided bodies 81C and 82C, each of which is formed in a U-shape, for example. Here, divided bodies 81C and 82C are attached so as to hold a portion on the side of another end part 144C of core part 146C therebetween in an extending direction of shaft part 50C to cover an outer periphery of the portion.

Further, divided bodies 81C and 82C are formed such that both side parts of each are narrowed toward the side of free end part 149C. In movable body 10C, divided bodies 81C and 82C each include a narrower leading end toward the side of free end part 149C in a state in which divided bodies 81C and 82C are attached to the portion on the side of another end part 144C of core part 146C.

Divided bodies 81C and 82C are formed of a high specific gravity material such as tungsten, respectively.

Divided bodies 81C and 82C are provided such that parts on the side of another end part 144C of core 14C are notched and divided bodies 81C and 82C are fitted into the parts, respectively. The side of another end part 144C of core 14C is a side of a leading end part thereof. Core 14C forms the movable body-main body of movable body 10C and has a columnar shape. That is, divided bodies 81C and 82C are attached to the parts of core 14C and are provided integrally with core 14C on the side of the other end part of core 14C.

Note that, divided bodies 81C and 82C may not be formed in a cross-sectional U shape, but may be formed in an L-shape as long as each shape of divided bodies 81C and 82C allows divided bodies 81C and 82C to be attached to core part 146C between one end part 142C and free end part 149C such that divided bodies 81C and 82C surround core part 146C. Further, when divided bodies 81C and 82C are formed to have the same shape, it is possible to reduce the manufacturing cost of main weight part 80C.

Divided bodies 81C and 82C are fixed to core part 146C by press-fitting or via an adhesive or the like. On core part 146C of core 14C, divided bodies 81C and 82C are disposed in a recessed part between coil body 120 and free end part 149C. Thus, even when a centrifugal force is generated by the turn of movable body 10C, divided bodies 81C and 82C are difficult to detach.

Further, main weight part 80C composed of divided bodies 81C and 82C is formed such that the length thereof in the width direction, that is, the vibration direction gradually decreases toward the side of free end part 149. Thus, the length of another end part (leading end part) 144C in the width direction, which is formed by main weight part 80C and free end part 149C, also becomes shorter in the width direction toward the side of the free end. Note that, in movable body 10C, the center of the magnetic poles of movable body 10C is located at the center of core part 146C on the coil axis of coil 12C.

[Configuration of Fixing Body 20C]

Fixing body 20C turnably supports movable body 10C via shaft part 50C.

Fixing body 20C includes, in addition to the magnets (first magnet 30C and second magnet 40C), base plate 22C and case 24C.

Base plate 22C is formed by a plate-like material such as a steel plate (a rectangular plate in the present embodiment). In the present embodiment, base plate 22C forms one side surface (here, a bottom surface) of vibration actuator 1C.

Case 24C is attached to base plate 22C so as to cover base plate 22C, and base plate 22C and case 24C form a housing that movably houses movable body 10C. In the present embodiment, the housing is formed to be hollow and to have a rectangular parallelepiped shape.

On a side of one end of the housing in the longitudinal direction, shaft part 50C is fixed along a direction orthogonal to the vibration direction of movable body 10C. Upper surface part 241C of case 24C forms another side surface facing the one side surface of vibration actuator 1C.

On base plate 22C, shaft part 50C is erected via shaft fixing part 23C on a side of one end of base plate 22C. Above base plate 22C, movable body 10C is disposed away from and facing base plate 22C. Further, in one end part of base plate 22C, first magnet 30C is disposed facing one end surface of one end part 142C of movable body 10C when energization is not performed, in an extending direction of movable body 10C. Further, in another end part of base plate 22C, second magnet 40C is disposed facing an end surface of another end part 144C (a leading end surface of free end part 149C) of movable body 10C when energization is not performed, in the extending direction of movable body 10C. Note that, the present embodiment is configured to include first magnet 30C, but may omit first magnet 30C and may be configured to include only second magnet 40C.

Case 24C is fixed to base plate 22C so as to cover movable body 10C facing base plate 22C. Another end of shaft part 50C is fixed to upper surface part 241C of case 24C, which faces base plate 22C in height (the Z direction), via a shaft fixing part (not illustrated).

Case 24C is formed in a box shape (a rectangular box shape in the present embodiment) that opens on a side of base plate 22C. Shaft part 50C is disposed between upper surface part 241C of case 24 and base plate 22C. Case 24C includes both of side surface parts 242C and 243C, one end surface part 244C, and another end surface part 245C. Both of side surface parts 242C and 243C are disposed away from and facing each other in the vibration direction of movable body 10C, for example, in the width direction thereof (the X direction). One end surface part 244C and another end surface part 245C are away from each other in the extending direction (here, in the depth direction (the Y direction)) of movable body 10C.

The dimensions of the housing formed by attaching case 24C to base plate 22C are not particularly limited. In the present embodiment, however, the housing is configured so as to have a rectangular parallelepiped shape in which, among the width (the X direction), the depth (the Y direction), and the height (the Z direction), the depth is the longest.

Case 24C and base plate 22C may be formed of a material having conductivity, for example, a plate-like material such as a steel plate (a rectangular plate in the present embodiment). Thus, base plate 22C and case 24C are capable of functioning as electromagnetic shields.

Further, on a side of another end of case 24C, buffer part 60C with which a side of a free end of movable body 10C that vibrates comes into contact is provided in both of side surface parts 242C and 243C of case 24C, respectively.

The magnets (first magnet 30C and second magnet 40C) move movable body 10C by cooperation with coil 12C. The magnet functions as a magnetic spring by means of a magnetic attraction force with respect to movable body 10C. In the present embodiment, the magnet and core 14C around which coil 12C is wound form the magnetic spring to movably support movable body 10C.

The magnets are arranged such that the magnetic poles thereof face each other in an axial direction of coil 12C with respect to coil 12C.

In the present embodiment, the magnets include first magnet 30C away from and facing one end part 142C of core 14C in the axial direction of coil 12C, and second magnet 40C away from and facing another end part 144C (free end part 149C) of core 14C in the axial direction of coil 12C.

Each of first magnet 30C and second magnet 40C is magnetized toward core 14C (movable body 10C). In the present embodiment, the magnetization directions of first magnet 30C and second magnet 40C are parallel to the axial direction of coil 12C. Each of first magnet 30C and second magnet 40C includes, each as a surface on a side facing core 14C, two different magnetic poles arranged in a direction (corresponding to the vibration direction of movable body 10C) orthogonal to the extending direction of shaft part 50C.

The magnetic poles are disposed such that a center of core 14C of movable body 10C (here, the center is on an axis of coil 12C and corresponds to a center of the magnetic poles when coil 12C is excited) is located to face a boundary between the magnetic poles, that is, a switching position of the magnetic poles.

The polarities of the magnetic poles of both of first magnet 30C and second magnet 40C are magnetized such that torque to be generated by exciting coil 12C of movable body 10C is generated in the same rotational direction as that of movable body 10C.

Figure 20:
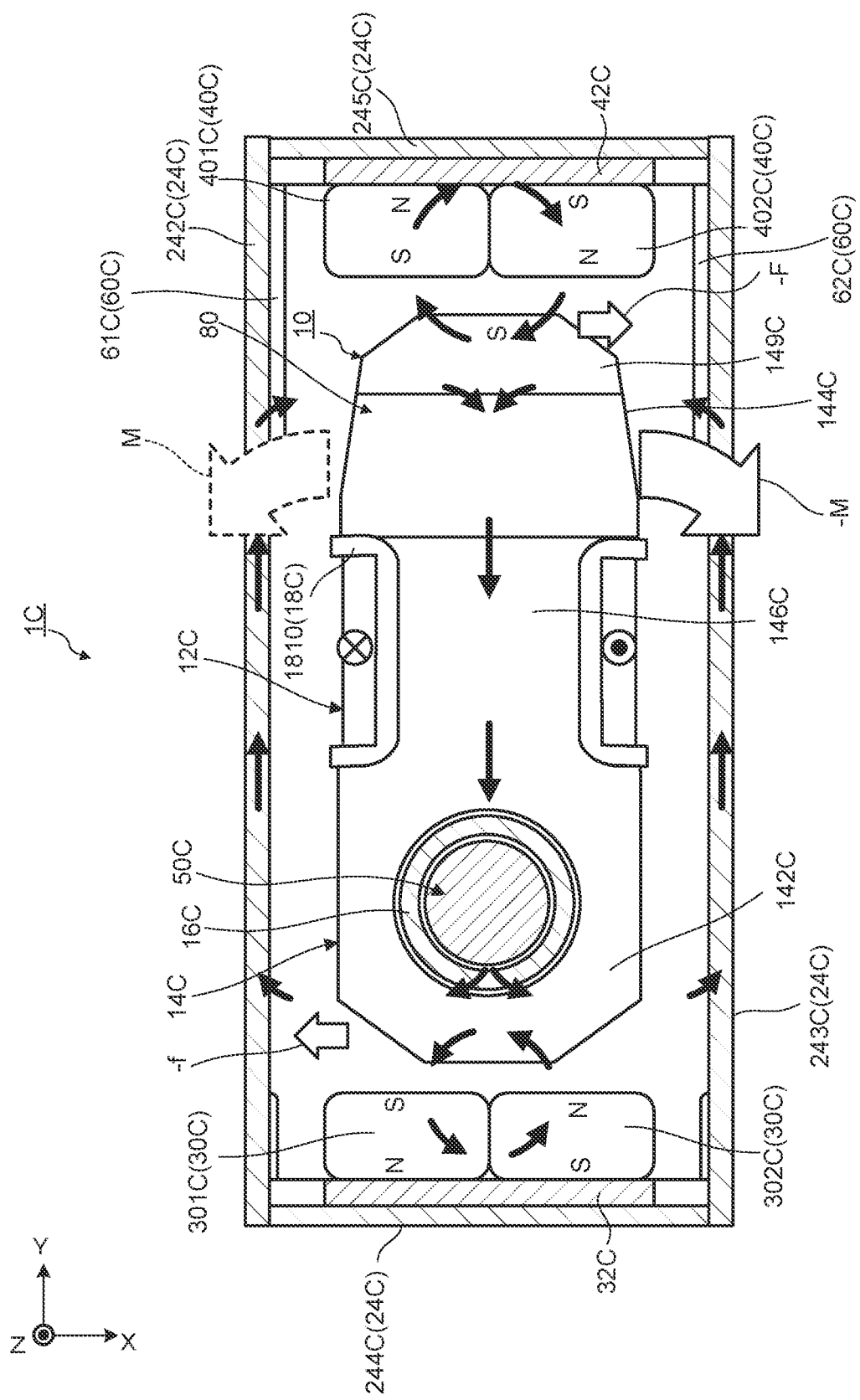
FIG. 20 illustrates a magnetic circuit of the vibration actuator.

In first magnet 30C and second magnet 40C, magnetic poles 301C and 401C each of which is disposed on a side of side surface part 242C and faces movable body 10C are each formed so as to be the same pole (the S pole in FIG. 20). Further, in first magnet 30C and second magnet 40C, magnetic poles 302C and 402C each of which is disposed on a side of side surface part 243C and faces movable body 10C are each formed so as to be the same pole (the N pole in FIG. 20).

First magnet 30C includes a rear surface on which back yoke 32C is bonded, and second magnet 40C includes a rear surface on which back yoke 42C is bonded, so that an improvement in an magnetic attraction force of each of first magnet 30C and second magnet 40C is achieved.

For example, it is supposed that magnetization is performed in first magnet 30C and second magnet 40C such that the S pole is on the side of side surface part 242C and the N pole is on the side of side surface part 243C. In this case, a magnetic flux emitted from the N pole and incident on the S pole is formed at first magnet 30C and second magnet 40C, respectively, when coil 12C is not energized as illustrated in FIG. 20. When energization is not performed, one end part 142C of core 14C around which coil 12C is wound is attracted to both the S and N poles of first magnet 30C, and is held at a switching position of magnetic poles 301C and 302C that are different from each other (the S and N poles). Further, another end part 144C of core 14C is attracted to both the S and N poles of second magnet 40C, and is held at a switching position of magnetic poles 401C and 402C that are different from each other (the S and N poles). First magnet 30C and second magnet 40C, together with core 14C that is a magnetic body of movable body 10C, function as a magnetic spring by means of magnetic attraction forces generated between first magnet 30C and second magnet 40C and core 14C to movably support movable body 10C.

Another end part 154C of flexible substrate 15C that is connected to coil 12C with one end part 152C is fixed to side surface part 242C.

Flexible substrate 15C is disposed so as to be adjacent to shaft part 50C between shaft part 50C and side surface part 242C that faces flexible substrate 15C in a direction orthogonal to the axial direction of shaft part 50C. One end part 152C of flexible substrate 15C, which is connected to coil 12C, is fixed to one end part of movable body 10C. Another end part 154C of flexible substrate 15C is fixed to side surface part 242C, which is fixing body 20C, in a state in which another end part 154C is exposed to an outer surface of the housing.

When movable body 10C moves, the movement range near shaft part 50C is smaller than in a portion on the side of the other end of movable body 10C. For this reason, a load applied to curved part 156C of flexible substrate 15C disposed near shaft part 50C is reduced. Thus, since flexible substrate 15C is fixed near shaft part 50C, it is possible to minimize displacement of flexible substrate 15C and to prevent disconnection due to a stress generated during movement.

Note that, it may be configured such that, for example, an elastic member such as an elastic adhesive or an elastic adhesive tape is interposed between one end part 152C of flexible substrate 15C and movable body 10C and absorbs an impact created during vibration.

[Magnetic Circuit of Vibration Actuator 1C]

Figure 21A:
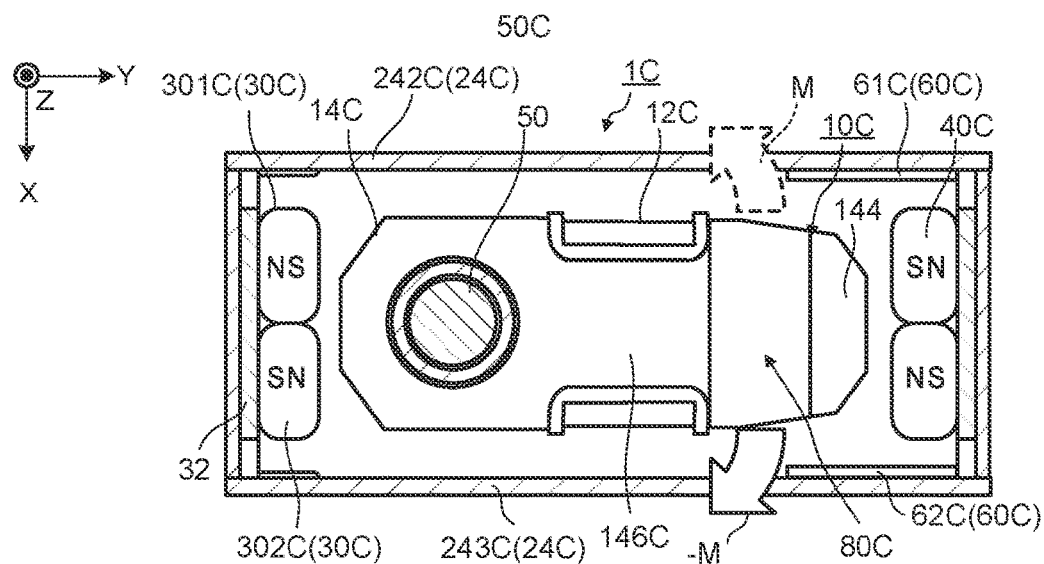
FIGS. 21A, 21B and 21C are longitudinal cross-sectional views illustrating operation of a movable body.
Figure 21B:
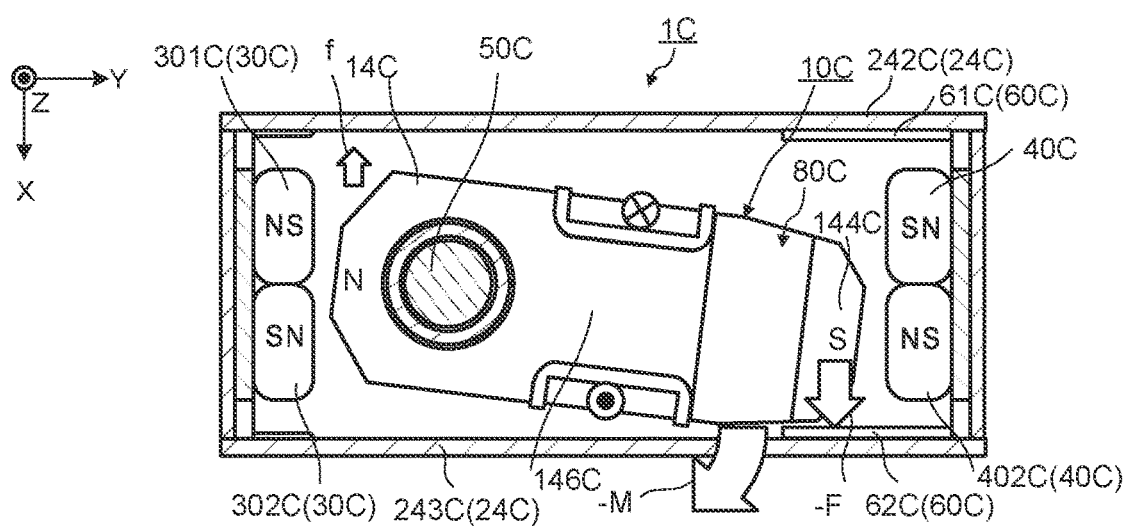
Figure 21C:
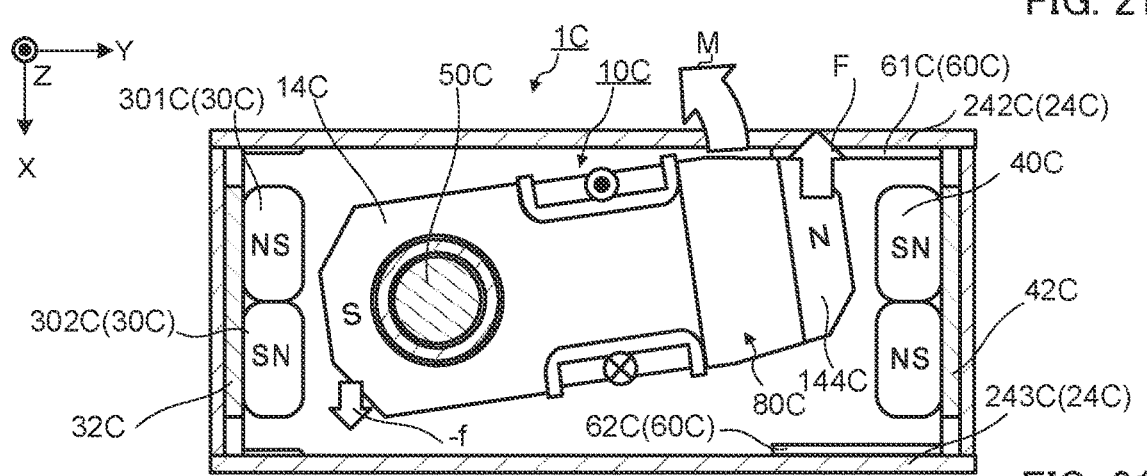

FIG. 20 illustrates a magnetic circuit of the vibration actuator, illustrating a state in which vibration actuator 1C is viewed from the plus side in the Z direction (upper side) to the minus side in the Z direction (lower side). FIGS. 21A to 21C are longitudinal cross-sectional views illustrating operation of movable body 10C, each illustrating a state in which vibration actuator 1C is viewed from the plus side in the Z direction (upper side) to the minus side in the Z direction (lower side). FIG. 21A illustrates a state of movable body 10C when energization is not performed (reference state). FIG. 21B illustrates a state of movable body 10C when coil 12C is energized clockwise when viewing vibration actuator 1C from a side of a leading end part of movable body 10C, that is, a side of another end part 144C of core 14C. FIG. 21C illustrates a state of movable body 10C when coil 12C is energized counterclockwise when viewing vibration actuator 1C from the side of the leading end part of movable body 10C, that is, the side of another end part 144C of core 14C.

In vibration actuator 1C, movable body 10C is disposed in a state in which the side of the one end of movable body 10C is supported via shaft part 50C between base plate 22C and case 24C of fixing body 20C. In addition, the magnets (first magnet 30C and second magnet 40C) are disposed to face the both end parts (one end part 142C and another end part 144C) of core 14C around which coil 12C is wound, with the two different magnetic poles of each magnet being directed toward a side of coil 12C, in the axial direction of coil 12C of movable body 10C. Magnetic pole 301C of first magnet 30C and magnetic pole 401C of second magnet 40C are the same pole, and magnetic pole 302C of first magnet 30C and magnetic pole 402C of second magnet 40C are the same pole.

In each magnet of first magnet 30C and second magnet 40C, magnetic poles 301C and 302C that are two different magnetic poles are arranged side by side in the vibration direction (the X direction) orthogonal to the axial direction of shaft part 50C, and magnetic poles 401C and 402C that are two different magnetic poles are arranged side by side in the vibration direction (the X direction) orthogonal to the axial direction of shaft part 50C.

Movable body 10C reciprocates in the X direction, that is, in a direction in which movable body 10C comes into contact with or is separated from side surface part 242C or 243C of case 24C, by energization of coil 12C via flexible substrate 15C from a power supply section (for example, driving control section 203 illustrated in FIGS. 22 to 24).

Specifically, another end part of movable body 10C (specifically, another end part 144C of core 14C) sways. In this way, a vibrational output of vibration actuator 1C is transmitted to a user of an electronic apparatus including vibration actuator 1C.

The magnetic circuit illustrated in FIG. 20 is formed in vibration actuator 1C.

In vibration actuator 1C, when coil 12C is not energized, that is, in the reference state, the both end parts (one end part 142C and another end part 144C) of core 14C around which coil 12C is wound are attracted to first magnet 30C and second magnet 40C, respectively.

A center of a length (length in the vibration direction) orthogonal to each axial direction of the both end parts (one end part 142C and another end part 144C) of core 14C is located at a position facing the switching position of the magnetic poles of the magnet. Note that, the center of the length (length in the vibration direction) orthogonal to each axial direction of the both end parts (one end part 142C and another end part 144C) is located on the same axis as the axis of coil 12C.

Specifically, one end part 142C of core 14C is attracted by magnetic attraction forces of both of magnetic poles 301C and 302C, which are different from each other, of first magnet 30C, and is held at the switching position of magnetic poles 301C and 302C.

Further, another end part (which may be configured as free end part 149C) 144C of core 14C is attracted by magnetic attraction forces of both of magnetic poles 401C and 402C, which are different from each other, of second magnet 40C, and is held at the switching position of magnetic poles 401C and 402C.

Thus, when energization is not performed, movable body 10C is held in the reference state only by the magnetic spring formed of first magnet 30C and second magnet 40C of fixing body 20C.

In vibration actuator 1C, coil 12C is disposed so as to be along and away from magnetic fluxes from first magnet 30C and second magnet 40C.

With this configuration, when energization is performed as illustrated in FIGS. 20 and 21B, the both end parts (one end part 142C and another end part 144C) of core 14C are magnetized so as to be magnetic poles different from each other by a current flowing through coil 12C. Specifically, one end part 142C is magnetized to the N pole, and another end part 144C is magnetized to the S pole.

Thus, one end part 142C is attracted to magnetic pole 301C of first magnet 30C and repels magnetic pole 302C of first magnet 30C to generate thrust f, and moves in a direction of thrust f. On the other hand, another end part 144C repels magnetic pole 401C of second magnet 40C, is attracted to magnetic pole 402C of second magnet 40C, and moves in a direction of thrust −F.

As illustrated in FIG. 21B, in vibration actuator 1C, the both end parts (one end part 142C and another end part 144C) located with shaft part 50C therebetween move in the directions of thrust f and thrust −F, respectively, by energizing coil 12C, thereby generating thrust −M that is the same rotational direction. Thus, movable body 10C rotates around shaft part 50C in a direction of thrust −M, and another end part 144C of movable body 10C moves onto the side of side surface part 243C, comes into contact (specifically, collides) with side surface part 243C, that is, the housing, and imparts vibration to the housing.

Further, when the energization direction of coil 12C is switched to the opposite direction and energization is performed as illustrated in FIG. 21C, thrust −f and thrust F whose directions are opposite to each other are generated. Specifically, one end part 142C is magnetized to the S pole, and another end part 144C is magnetized to the N pole. Thus, one end part 142C repels magnetic pole 301C of first magnet 30C and is attracted to magnetic pole 302C of first magnet 30C to generate thrust −f, and moves in a direction of thrust −f. On the other hand, another end part 144C is attracted to magnetic pole 401C of second magnet 40C, repels magnetic pole 402C of second magnet 40C, and moves in a direction of F.

As illustrated in FIG. 21C, in vibration actuator 1C, the both end parts (one end part 142C and another end part 144C) located with shaft part 50C therebetween move in the directions of thrust −f and thrust F, respectively, by energizing coil 12C, thereby generating thrust M that is the same rotational direction. Thus, movable body 10C rotates around shaft part 50C in a direction of thrust M, and another end part 144C of movable body 10C moves onto the side of side surface part 242C opposite to side surface part 243C, comes into contact (specifically, collides) with side surface part 242C, that is, the housing, and imparts vibration to the housing.

In vibration actuator 1C, movable body 10C is supported such that movable body 10C is capable of reciprocatingly and rotationally vibrating around shaft part 50C with respect to fixing body 20C only by means of the magnetic spring using the magnet (at least second magnet 40C) and core 14C, without using an elastic member such as a plate spring (metal spring). Accordingly, unlike a vibration actuator configured to support a movable body such that the movable body is capable of vibrating by a metal spring as in the related art, damage due to metal fatigue or impact, which represents a problem specific to metal springs, is prevented.

[Effects of Vibration Actuator 1C]

In vibration actuator 1C, movable body 10C includes core 14C around which coil 12C is wound and in which one end part 142C and another end part 144C protrude from both ends of coil 12C, respectively, and fixing body 20C includes the magnets (first magnet 30C and second magnet 40C). Further, shaft part 50C turnably supports movable body 10C with respect to fixing body 20C on the side of one end part 142C of core 14C. When energization is not performed, second magnet 40C is away from and faces another end part 144C, and includes magnetic poles 401C and 402C that are two magnetic poles having different polarities and arranged in a reciprocating and rotational vibration direction. Coil-side weight parts 802 and 804 are disposed in coil 12C.

Thus, even in a case where the external dimensions of movable body 10C are set in design or the like, it is possible to increase the mass of movable body 10C relatively easily, and it is possible to increase inertia and realize a desired vibration output without affecting the magnetic spring constant and torque without magnetic flux saturation.

Further, in the present embodiment, both side parts of coil bobbin 18C surrounding four sides of core part 146C, where the both side parts are away from each other in the vibration direction, are formed as coil-side weight parts 802 and 804 in the coil, which further makes it possible to increase the weight of a side of another end part 144C rather than one end part 142C serving as a sway portion without changing the entire size of movable body 10C itself.

Further, coil bobbin 18C can be divided into first divided bobbin body 1810, second divided bobbin body 1820, and coil-side weight parts 802 and 804. Accordingly, coil bobbin 18C can be easily disposed on core part 146C only by attaching first divided bobbin body 1810, second divided bobbin body 1820, and coil-side weight parts 802 and 804 to core part 146C from outside. Further, only by attaching coil bobbin 18C to core 14C, it is possible to increase the mass of movable body 10C without changing the external dimensions of movable body 10C.

As described above, coil-side weight parts 802 and 804 make it possible to increase, without changing the size of movable body 10C, the mass of the leading end part (another end part) of movable body 10C such that coil-side weight parts 802 and 804 are not detached from movable body 10C. Thus, vibration actuator 1C makes it possible to increase inertia without lowering the resonance point in a state in which the magnetic characteristics are maintained.

Further, main weight part 80C made of a high specific gravity material is attached to notch 148C obtained by notching a part on a side of another end part 144C of core 14C. Main weight part 80C is provided in notch 148C such that movement of main weight part 80C in the vibration direction in notch 148C is regulated. Thus, main weight part 80C is provided as a part of core 14C in movable body 10C in a state in which four sides of main weight part 80C are surrounded. Core 14C becomes the entire length of movable body 10C that sways, and forms the movable body-main body. The four sides of weight part 80C are in the moving direction of movable body 10C during reciprocating and rotational movement.

That is, together with coil-side weight parts 802 and 804, main weight part 80C makes it possible to further increase, without changing the size of movable body 10C, the mass of the leading end part (another end part) of movable body 10C such that weight part 80C is not detached from movable body 10C. Thus, it is possible to realize vibration actuator 1C in which inertia is increased without lowering the resonance point in a state in which the magnetic characteristics are maintained.

Further, in the present embodiment, the magnet is disposed as first magnet 30C and second magnet 40C on both sides of core 14C. Magnetic poles 301C and 302C that are two magnetic poles, and magnetic poles 401C and 402C that are two magnetic poles are disposed, respectively, such that torque to be generated in each of end parts 142C and 144C of movable body 10C is generated in the same rotational direction. In the both end parts (one end part 142C and another end part 144C) of core 14C, magnetic attraction forces are generated between core 14C and first magnet 30C and second magnet 40C, and core 14C and first magnet 30C and second magnet 40C attract each other.

Thus, when movable body 10C is moved by cooperation between first magnet 30C and second magnet 40C and coil 12C, a load applied to shaft part 50C due to magnetic attraction forces is offset, and it is possible to reduce a load applied to shaft part 50C and bushing 16C.

Further, in the housing, movable body 10C comes into contact (is in a state corresponding to a state of coming into contact) with side surface part 242C or 243C of the housing so that vibration can be directly transmitted to the vibration actuator-housing and a large vibration can be generated from vibration actuator 1C itself. In addition, since movable body 10C comes into contact with fixing body 20C (housing) when movable body 10C vibrates, the amount of vibration also becomes constant, and a stable vibrational output can be realized as vibration actuator 1C.

Note that, another end part 144C of core 14C, which is the free end part of movable body 10C, is formed such that the thickness thereof in the X direction becomes thinner toward the side of the free end. Thus, the movement range of movable body 10C when another end part 144C sways and comes into contact with cushion material 61C or 62C is wider in comparison with a case where another end part 144C of core 14C, which is the free end part of movable body 10C, has the same thickness in the X direction toward the side of the free end. Accordingly, vibration actuator 1C is capable of ensuring a larger vibrational output.

Further, vibration actuator 1C may be configured such that inner wall surfaces (side surface parts 242C and 243C) of case 24C come into contact with movable body 10C via buffer part 60C such as cushion materials (cushion materials 61C and 62C). Buffer part 60C is capable of alleviating an impact when movable body 10C vibrates to come into contact with base plate 22C or case 24C, and is capable of, while reducing generation of a contact sound or a vibration noise, transmitting vibration to a user. Further, since movable body 10C alternately comes into contact (specifically, collides) with base plate 22C and case 24C via buffer part 60C every time movable body 10C vibrates, the vibrational output is amplified. Thus, a user can physically feel a vibrational output greater than an actual vibrational output by movable body 10C.

Here, vibration actuator 1C is driven by an AC wave that is input from the power supply section (for example, driving control section 203 illustrated in FIGS. 22 to 24) to coil 12C via flexible substrate 15C. That is, the energization direction of coil 12C is switched periodically, and thrust M on the plus side in the X direction and thrust −M on the minus side in the X direction alternately act on movable body 10C. Thus, the side of the other end of movable body 10C vibrates in a circular arc shape within the XY plane.

Hereinafter, a brief description will be given of the driving principle of vibration actuator 1C. In vibration actuator 1C of the present embodiment, movable body 10C vibrates with respect to fixing body 20C at resonance frequency $f_r$ [Hz] calculated by following equation 1 where J [kg·m²] represents the moment of inertia (inertia) of movable body 10C and $K_{sp}$ represents the spring constant of the magnetic spring in the torsion direction.

[4]

$$f_r = \frac{1}{2\pi}\sqrt{\frac{K_{sp}}{J}} \quad \text{(Equation 1)}$$

$f_r$: Resonance frequency [Hz]
J: Moment of inertia [kg·m²]
$K_{sp}$: Spring constant [N·m/rad]

Since movable body 10C forms a mass part in a vibration model of a spring-mass system, movable body 10C is brought into a resonance state when an AC wave of a frequency equal to resonance frequency $f_r$ of movable body 10C is input to coil 12C. That is, movable body 10C can be efficiently vibrated by inputting an AC wave of a frequency, which is substantially equal to resonance frequency $f_r$ of movable body 10C, from the power supply section (for example, driving control section 203 illustrated in FIGS. 22 to 24) to coil 12C.

The equation of movement and the circuit equation representing the driving principle of vibration actuator 1C are indicated below. Vibration actuator 1C is driven based on the equation of movement represented by following equation 2 and on the circuit equation represented by following equation 3.

[5]

$$J\frac{d^2\theta(t)}{dt^2} = K_t i(t) - K_{sp}\theta(t) - D\frac{d\theta(t)}{dt} \quad \text{(Equation 2)}$$

J: Moment of inertia [kg·m²]
θ(t): Angle [rad]
$K_t$: Torque constant [N·m/A]
i(t): Current [A]
$K_{sp}$: Spring constant [N·m/rad]
D: Damping coefficient [N·m/(rad/s)]

[6]

$$e(t) = Ri(t) + L\frac{di(t)}{dt} + K_e\frac{d\theta(t)}{dt} \quad \text{(Equation 3)}$$

e(t): Voltage [V]
R: Resistance [Ω]
L: Inductance [H]
$K_e$: Counter electromotive force constant [V/(rad/s)]

That is, moment of inertia (inertia) J [kg·m²], angle of rotation θ(t) [rad], torque constant $K_t$ [N·m/A], current i(t) [A], spring constant $K_{sp}$ [N·m/rad], damping coefficient D [N·m/(rad/s)], and the like of movable body 10C in vibration actuator 1C can be changed appropriately as long as equation 2 is satisfied. Further, voltage e(t) [V], resistance R [Ω], inductance L [H], and counter electromotive force constant $K_e$ [V/(rad/s)] can be changed appropriately as long as equation 3 is satisfied.

As described above, in vibration actuator 1C, a great vibrational output can be efficiently obtained in a case where coil 12C is energized using an AC wave corresponding to resonance frequency $f_r$ determined by moment of inertia (inertia) J of movable body 10C and spring constant $K_{sp}$ of the magnetic spring.

<Electronic Apparatus in which Vibration Actuator is Mounted>

FIGS. 22 to 24 each illustrate an example of an electronic apparatus in which the vibration actuator is mounted. FIG. 22 illustrates an example in which the vibration actuator is mounted in game controller GC, FIG. 23 illustrates an example in which the vibration actuator is mounted in smartphone SP as a portable terminal, and FIG. 24 illustrates an example in which the vibration actuator is mounted in wearable terminal W.

Game controller GC is, for example, connected to a game machine main body by radio communication, and is used by being gripped or held by a user. Here, game controller GC has a rectangular plate shape, and the user operates game controller GC while grasping right and left sides thereof with both hands.

Game controller GC notifies a user of a command from the game machine main body by vibration. Note that, game controller GC has, although not illustrated, functions other than the command notification, for example, an input operation section with respect to the game machine main body.

Smartphone SP is, for example, a portable communication terminal such as a mobile phone and a smartphone. Smartphone SP notifies a user of an incoming call from an external communication device by vibration, and also realizes each function of smartphone SP (for example, a function that gives a feeling of operation or realism).

Wearable terminal W is worn for use by a user. Here, wearable terminal W has a ring shape, and is attached to a finger of the user. Wearable terminal W is connected to an information communication terminal (for example, a mobile phone) by radio communication. Wearable terminal W notifies the user of an incoming call or an incoming mail in the information communication terminal by vibration. Note that, wearable terminal W may have a function (for example, input operation to the information communication terminal) other than the incoming call notification.

As illustrated in FIGS. 22 to 24, each electronic apparatus such as game controller GC, smartphone SP, and wearable terminal W includes communication section 201, processing section 202, driving control section 203, and vibration actuator 100A, 100B, 100C or 100D as a driving section. Note that, vibration actuators 100A, 100B, 100C and 100D illustrated in FIGS. 22 to 24 each represent applications of vibration actuator 1 (encompassing the vibration actuators including moving body 10A or 10B as well) or 1C illustrated in FIGS. 1 to 21. Further, a plurality of vibration actuators 100A and 100B are mounted in game controller GC.

Vibration actuators 100A, 100B, 100C and 100D are mounted in game controller GC, smartphone SP, and wearable terminal W such that, for example, the main face of the terminal is parallel to surfaces (here, side surface parts 242 and 243 of case 24) orthogonal to the vibration direction of vibration actuator 1. The main surface of the electronic apparatus is a surface that comes into contact with a body surface of a user, and means, in the present embodiment, a vibration transmitting surface that comes into contact with a body surface of a user to transmit vibration.

Specifically, vibration actuators 100A and 100B are mounted in game controller GC such that a surface with which a fingertip, a ball of a finger, a palm of a hand or the like of a user operating game controller GC comes into contact, or a surface provided with an operation section is orthogonal to the vibration direction. Further, in the case of smartphone SP, vibration actuator 100C is mounted therein such that a display screen (touch screen surface) is orthogonal to the vibration direction. In the case of wearable terminal W, vibration actuator 1 is mounted therein such that inner peripheral surface 208 of a housing having a ring shape is the main surface (vibration transmitting surface) and inner peripheral surface 208 and the XY plane are in substantially parallel (including parallel) with each other. Thus, vibration in a direction perpendicular to the main surface of game controller GC, smartphone SP or wearable terminal W is transmitted to the user.

Communication section 201 is connected to an external communication device by radio communication, receives a signal from the communication device, and outputs the signal to processing section 202. In the case of game controller GC, the external communication device is a game machine main body as an information communication terminal, and communication is performed in accordance with a short-range radio communication standard such as Bluetooth (registered trademark). In the case of smartphone SP, the external communication device is, for example, a base station, and communication is performed in accordance with mobile communications standards. Further, in the case of wearable terminal W, the external communication device is, for example, an information communication terminal such as a mobile phone, smartphone and a portable game terminal, and communication is performed in accordance with a short-distance radio communication standard such as Bluetooth (registered trademark).

Processing section 202 converts an input signal into a driving signal for driving vibration actuator 100A, 100B, 100C or 100D by a conversion circuit section (illustration is omitted), and outputs the driving signal to driving control section 203. Note that, in smartphone SP, processing section 202 generates a driving signal based not only on a signal input from communication section 201 but also on a signal input from various function sections (illustration is omitted; for example, an operation section such as a touch screen).

Driving control section 203 is connected to vibration actuator 100A, 100B, 100C or 100D, and a circuit for driving vibration actuator 100A, 100B, 100C or 100D is mounted therein. Driving control section 203 provides vibration actuator 100A, 100B, 100C or 100D with a driving signal.

Vibration actuator 100A, 100B, 100C or 100D is driven in accordance with a driving signal from driving control section 203. Specifically, in vibration actuator 100A, 100B, 100C or 100D, movable bodies 10 and 10A to 10C vibrate in a direction orthogonal to the main surface of game controller GC, smartphone SP, or wearable terminal W.

Since movable bodies 10 and 10A to 10C come into contact with side surface part 242, 243, 242C or 243C of cases 24 and 24C via cushion material 61, 62, 61C or 62C every time movable bodies 10 and 10A to 10C vibrate, an impact on surface part 242, 243, 242C or 243C of cases 24 and 24C (that is, an impact on the housing) accompanied by the vibration of movable bodies 10 and 10A to 10C is transmitted directly to a user as vibration. In particular, in the case of game controller GC, the plurality of vibration actuators 100A and 100B are mounted therein so that one of the plurality of vibration actuators 100A and 100B can be driven or both thereof can be driven at the same time, depending on an input driving signal.

Since vibration perpendicular to a body surface of a user which comes into contact with game controller GC, smartphone SP or wearable terminal W is transmitted to the body surface of the user, sufficient physically-felt vibration can be given to the user. In game controller GC, body-felt vibration can be given to the user with one or both of vibration actuators 100A and 100B, and vibration with a high expression capability can be given, such as at least selectively giving strong vibration or weak vibration.

As described above, vibration actuators 1 and 1C are each mounted as a vibration generation source in electronic apparatuses such as a game apparatus (game controller GC), smartphone SP and wearable terminal W (see FIGS. 22 to 24), for example. Vibration actuators 1 and 1C mounted in electronic apparatuses realize a vibration function of the electronic apparatuses by the reciprocating and rotational vibration of movable bodies 10 and 10A to 10C. For example, vibration actuators 1 and 1C vibrate to give a feeling of operation or realism to a user or notify a user of an incoming call.

Hereinabove, the invention made by the present inventors has been specifically described based on the embodiments. However, the present invention is not limited to the above-described embodiments and modifications can be made without departing from the gist thereof.

Further, for example, it is also preferable that the vibration actuator according to the present invention be applied to a portable apparatus (for example, a portable information terminal, such as a tablet PC, and a portable game terminal) other than game controller GC, smartphone SP, and wearable terminal W indicated in the embodiments. Further, vibration actuators 1 and 1C in the present embodiments can also be used for, in addition to the portable apparatus described above, an electric cosmetic tool such as a facial massage machine that requires vibration.

It should be understood that the embodiments disclosed herein are illustrative in every respect and not limitative. The scope of the present invention is specified not by the foregoing description but by the claims, and is intended to include all modifications in so far as they are within the scope of the appended claims or the equivalents thereof.

INDUSTRIAL APPLICABILITY

The vibration actuator according to the present invention is capable of, without an increase in size and affecting magnetic characteristics, increasing inertia during driving, is small and is capable of giving sufficient physically-felt vibration to a user, and is useful as being equipped in an electronic apparatus such as a game controller, a smartphone or a wearable terminal.

REFERENCE SIGNS LIST

1, 1C, 100A, 100B, 100C, 100D Vibration actuator
10, 10A, 10B, 10C Movable body
12, 12C Coil
14, 14A, 14B, 14C Core
15, 15C Flexible substrate
16, 16C Bushing (bearing)
18, 18B Bobbin
18C Coil bobbin
20, 20C Fixing body
22, 22C Base plate
23, 23C Shaft fixing part
24, 24C Case
30, 30C First magnet
32, 32C, 42, 42C Back yoke
40, 40C Second magnet
50, 50C Shaft part
60, 60C Buffer part
61, 61C, 62, 62C Cushion material
80, 80A, 80B Weight part
80C Main weight part (notch weight part)
81B, 82B Divided body
142, 142C, 152, 152C One end part
144, 144C, 154, 154C Another end part
146, 146A, 146B, 146C Core part
147, 147B Extended core part (central shaft part)
148, 148A, 148B, 148C Notch
149, 149B Head part
149C Free end part
156, 156C Curved part
181, 182, 184, 185 Divided bobbin body
181a, 182a, 181b, 182b Flange
181c, 182c Main body surface part
188C Tying part
201 Communication section
202 Processing section
203 Driving control section
208 Inner peripheral surface
241, 241C Upper surface part
242, 242C, 243, 243C Side surface part
244, 244C One end surface part
245, 245C Another end surface part
282, 282C, 284, 284C Washer
301, 301C, 302, 302C, 401, 401C, 402, 402C Magnetic pole
802, 804 Coil-side weight part
1420, 1440 End surface
1810 First divided bobbin body
1820 Second divided bobbin body

What is claimed is:

1. A rotating vibration actuator with a weight, comprising:
a movable body including a coil and a core around which the coil is wound, the core including a first end part and a second end part that protrude from both ends of the coil, respectively;
a fixing body including a magnet; and
a shaft part turnably supporting the movable body with respect to the fixing body on a side of the first end part of the core, the movable body reciprocatingly and rotationally vibrating by cooperation between the coil and the magnet, the coil being energized, wherein:
the magnet is disposed away from and facing at least the second end part when energization is not performed, the magnet including two magnetic poles which have different polarities and which are arranged in a reciprocating and rotational vibration direction,
a weight part is disposed in the coil,
the coil is wound around a bobbin externally applied to a peripheral surface of the core,
the weight part forms a part of the bobbin,
the bobbin includes a first divided bobbin body and a second divided bobbin body which are made of an insulator and which are attached to the core so as to hold the core therebetween from outside of the core, and
the weight part is a covering side wall part disposed so as to cover a side surface of the core between the first divided bobbin body and the second divided bobbin body.

2. The rotating vibration actuator with a weight according to claim 1, wherein the weight part is provided between the core and the coil.

3. The rotating vibration actuator with a weight according to claim 1, wherein:
the core extends so as to connect between the first end part and the second end part, and includes a core part having a cross section orthogonal to an extending direction of the core, the cross section being smaller than the first end part and the second end part,
the bobbin is attached to the core so as to surround the core part, and
the coil includes an outer surface which is provided so as to be continuous from an outer surface of the first end part to an outer surface of the second end part in a longitudinal direction.

4. The rotating vibration actuator with a weight actuator according to claim 1, wherein:
the second end part is provided with a notch, and
the notch is provided with a notch weight part having a larger specific gravity than the core.

5. An electronic apparatus in which the vibration actuator according to claim 1 is mounted.

* * * * *